United States Patent
Padalkar et al.

(10) Patent No.: US 10,785,373 B1
(45) Date of Patent: Sep. 22, 2020

(54) SYSTEMS AND METHODS FOR AN INCIDENT MANAGEMENT FRAMEWORK FOR USER CARE

(71) Applicant: Walmart Apollo, LLC, Bentonville, AR (US)

(72) Inventors: Nitin Bhalchandra Padalkar, Sunnyvale, CA (US); Sairanjit Polepeddi, Sunnyvale, CA (US); Dharani Prasad Pannam, Sunnyvale, CA (US); Hua Zhang, Sunnyvale, CA (US); Rajesh Kata, Mountain House, CA (US); Soubhagya Ranjan Chhotray, Milpitas, CA (US); Kruti Pradeep Shah, Sunnyvale, CA (US); Matthew Joseph Coelho, San Francisco, CA (US); Dinoop Dayanand, Santa Clara, CA (US); Yao-Wen Shiu, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/778,099

(22) Filed: Jan. 31, 2020

(51) Int. Cl.
*H04M 3/51* (2006.01)
*H04M 3/493* (2006.01)
(Continued)

(52) U.S. Cl.
CPC ........ *H04M 3/5191* (2013.01); *G06F 16/951* (2019.01); *G06Q 30/016* (2013.01); *G06Q 50/01* (2013.01); *H04M 3/42382* (2013.01); *H04M 3/4933* (2013.01); *H04M 3/5237* (2013.01); *H04M 2201/42* (2013.01); *H04M 2203/254* (2013.01)

(58) Field of Classification Search
CPC ........... H04M 3/5191; H04M 3/42382; H04M 3/4933; H04M 3/5237; H04M 2201/42; H04M 2203/254; G06F 16/951; G06Q 30/016; G06Q 50/01
USPC .................. 379/265.09, 265.01, 266.01, 309
See application file for complete search history.

(56) References Cited

U.S. PATENT DOCUMENTS 6,700,972 B1  3/2004  McHugh et al.
9,648,167 B2  5/2017  Riahi et al.
(Continued)

*Primary Examiner* — Quynh H Nguyen
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform generating an incident report for an incident request received from a user device of a user; sending an application program interface (API) request to a management platform for customer care to identify the user; assigning the incident report to an associate user interface of an associate device of an associate; retrieving a customer record associated with the user from a database of the management platform for customer care; populating the associate user interface with the customer record; automatically recording in real-time a new record of a present interaction between the associate and the user for the incident report; and transmitting the new record for storage in the database of the management platform for customer care. Other embodiments are disclosed.

20 Claims, 17 Drawing Sheets

(51) Int. Cl.
  *H04M 3/42* (2006.01)
  *H04M 3/523* (2006.01)
  *G06Q 50/00* (2012.01)
  *G06F 16/951* (2019.01)
  *G06Q 30/00* (2012.01)

(56) References Cited

U.S. PATENT DOCUMENTS

2017/0214793 A1 7/2017 Surana et al.
2018/0114234 A1* 4/2018 Fighel ................. G06F 11/3409
2019/0361992 A1* 11/2019 Kaguma ............... H04L 9/3239

* cited by examiner

FIG. 7

Review Incident 1805505-86549 — 801

Steven Harrison  Contact ID 368177015798
✉ steven.harrison0408@gmail.com   📞 (650) 555-1234   ✉ (650) 555-1234   📞 ⊘
+1 Order Contact Reason*  |  Contact Type  |  Escalate
Customer ▾       |  Customer ▾    |  Select or Type ▾

Action — 802

| Type | Order | Item | Amount | Reason |
|---|---|---|---|---|
| Refund | 654177015798 | Band-Aid Brand Adhesive Bandages featuring Disney Pri... | 3.50 | Damaged |
| Promo Code | 654177015798 | 10% off next order | | Inconvenience |

Other Agents Notes — 803

| What | | When | Agent | Note |
|---|---|---|---|---|
| Promo Code | | 05/05/2017 10:00 AM | markhm_agent | Customer called complaining about it. |
| Tiffany gc asking to change the payment of the order has already been placed***let customer know our system does not allow us to that she will need to cancel the order and resubmit with a new payment als.. | | 05/05/2017 08:04 AM | leona_roberson | Customer called complaining about it. |

Your Notes* — 804

01:59 time       [Save and Close]   [Collapse]

Steven Harrison  
✉ steven.harrison0408@gmail.com    📞 (650) 555-1234

3681770157984

| | | |
|---|---|---|
| Google Home Orders<br>3681770157984 | Order Placed On<br>Juine 06, 2017<br>Tue, 09:25AM EST | Order Total($)<br>Original: ~~190.90~~<br>Current: 191.90 |
| Status<br>On Hold | Promocode<br>CHRISTMAS10<br>Lookup code | Order Placed By<br>Customer |
| | | Source<br>mWeb |

⊕ Spoof Account | ▭

N. Rodriguez ⌄
Agent

Advanced Search

Cancel Items(3)

⊗ Remove Items

| | Item ID | Item Name | Qty./Wt. | Reason | Notes | Last Status | Estimated Ship Date |
|---|---|---|---|---|---|---|---|
| ☐ | 8171622 | Link Depot Gold-Plated High-Speed HDMI Cable | Select ▽ | Select or Type ▽<br>☐ Apply to all | Enter comments<br>☐ Apply to all | Ready for pickup | 03/11/17 |
| ☐ | 9981651 | Hanes Men's EcoSmart Short Sleeve Jersey Golf Shirt, Blue | Select ▽ | Select or Type ▽ | Enter comments | Ready for pickup | 03/12/17 |
| ☐ | 1009788 | Coleman 8-Person Tenaya Lake Fast Pitch Cabin Tent | 1 | Select or Type ▽ | Enter comments | Delivered | 03/12/17 |

[Submit] [Cancel]

SYSTEMS AND METHODS FOR AN INCIDENT MANAGEMENT FRAMEWORK FOR USER CARE

TECHNICAL FIELD

This disclosure relates generally to an incident management framework for user care.

BACKGROUND

Generally, a user contacts a customer service platform for various reasons such as status updates on an order, issues with past orders, and other such reasons. Conventional processes of interacting with a user reporting an issue often involved using one or more computer systems to look up historical information and create an incident report. Many customer service systems have independent computer applications for user information and incident reports. Such processes can be time consuming due to the complexity of computer-processes searching through multiple programs and/or computer systems to address the issue reported by the computer in real-time.

BRIEF DESCRIPTION OF THE DRAWINGS

To facilitate further description of the embodiments, the following drawings are provided in which:

FIG. 7 illustrates an exemplary user interface showing a webpage of a website;

FIG. 8 illustrates an exemplary user interface showing a webpage of a website;

FIG. 9 illustrates an exemplary user interface showing a webpage of a website;

FIG. 10. illustrates an exemplary user interface showing a webpage of a website;

FIG. 11. illustrates an exemplary user interface showing a webpage of a website;

Figure 1:
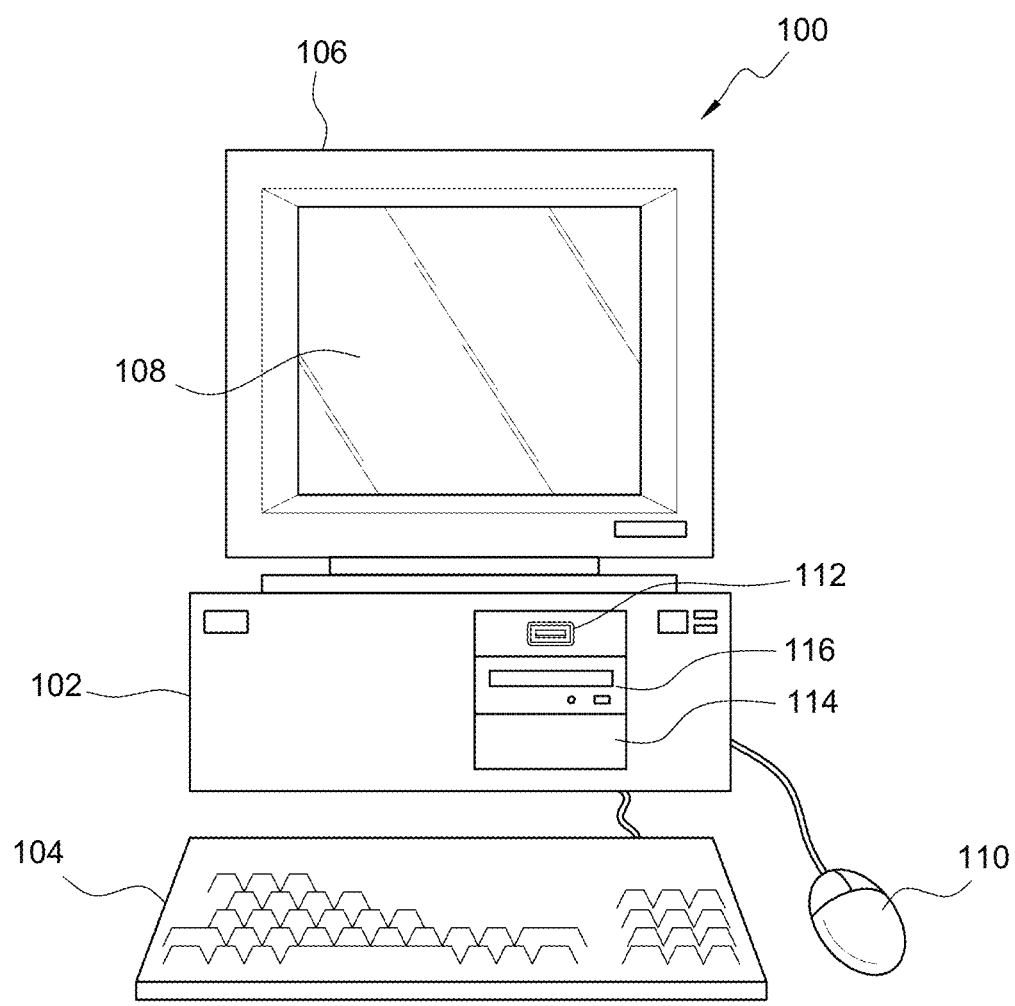
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

A management platform server can be capable of integrating multiple computer systems into a single independent platform while an associate (e.g., agent) interacts with the user to address a customer service related issue. Such a system can pre-screen an incoming caller from a user through an incident management application and assign the caller to the associate. The associate can use the management platform server to locate historical information on the issue including all intermediate communications recorded between the user and one or more associates.

Figure 2:
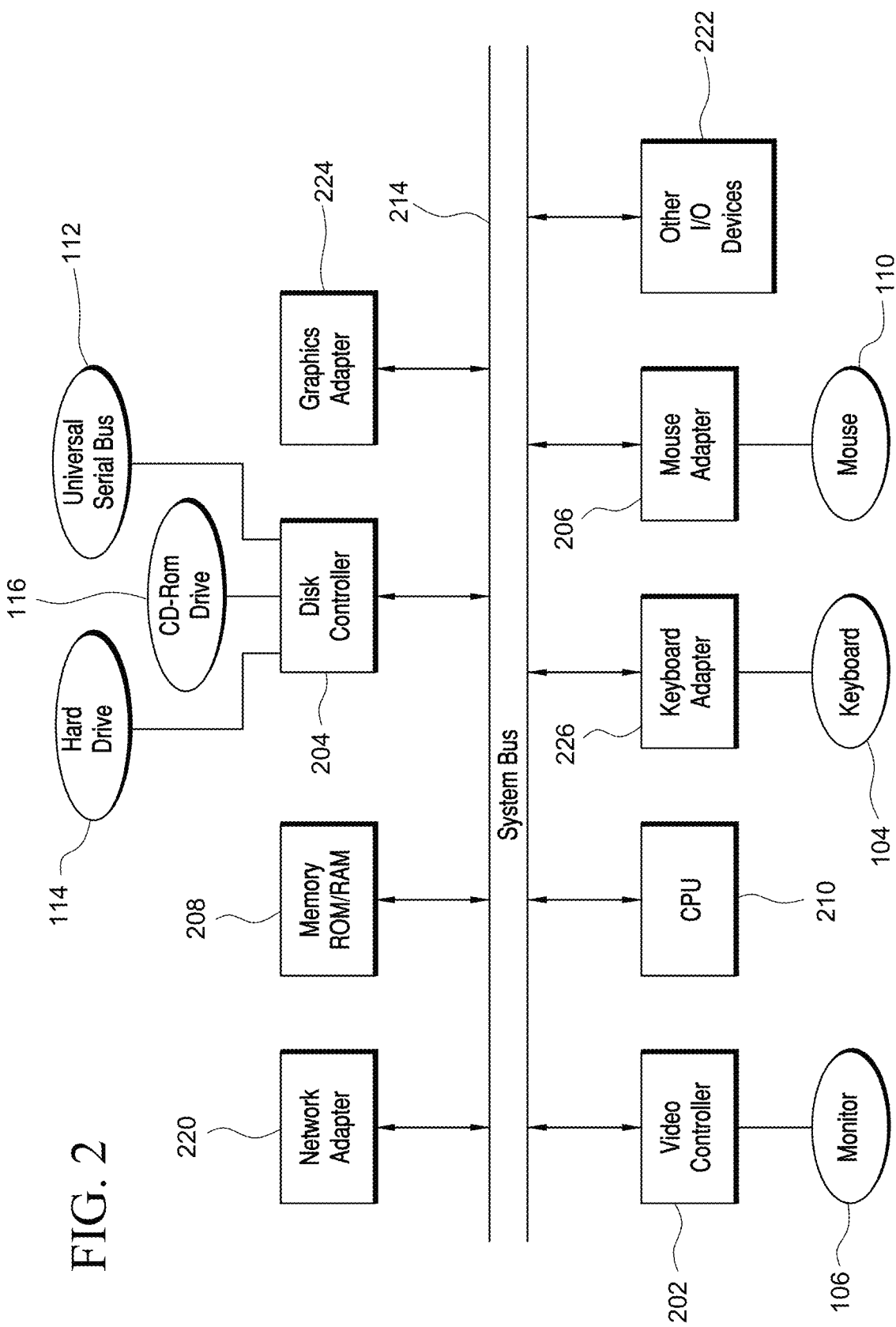
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
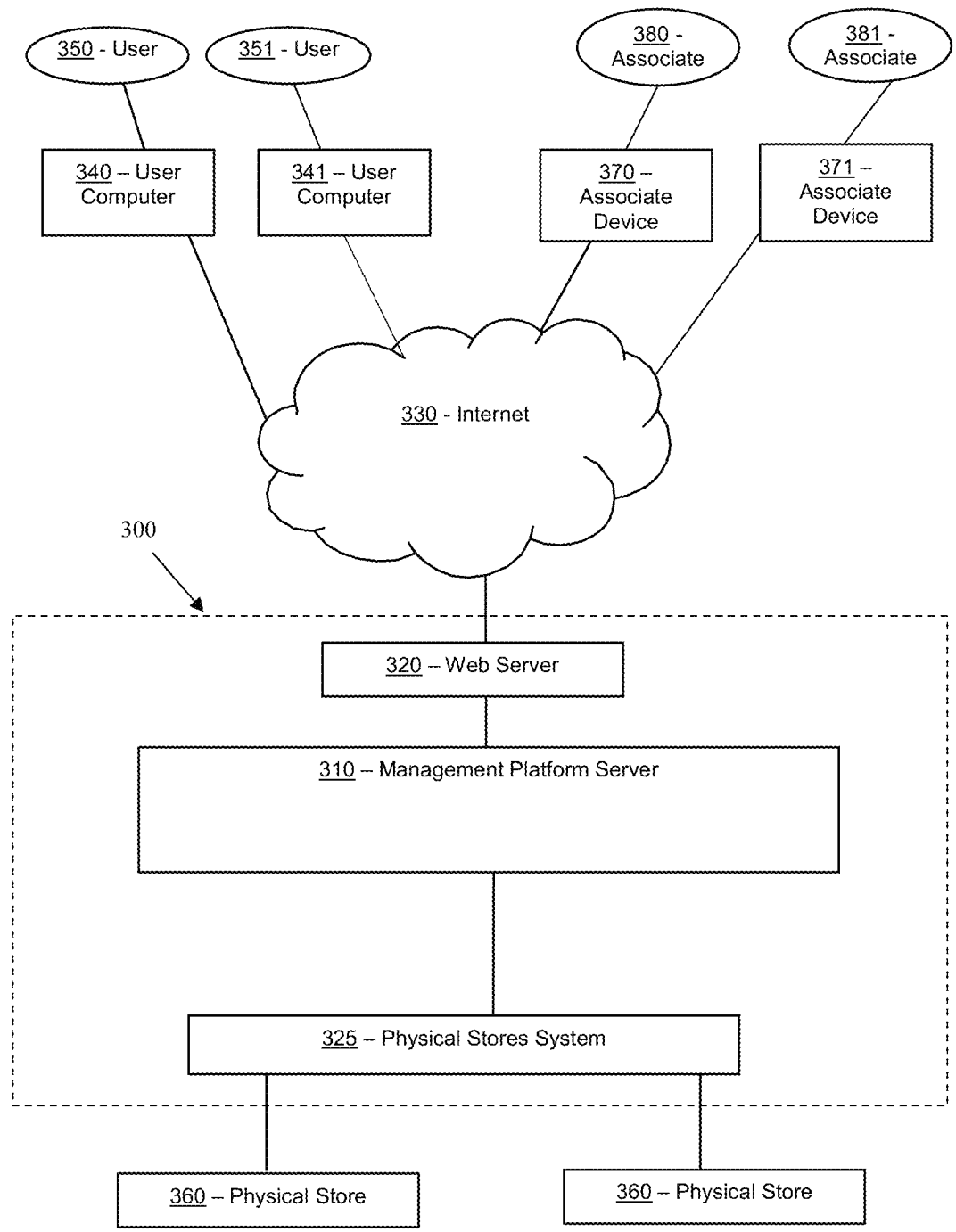
FIG. 3 illustrates a block diagram of a system that can be employed for an incident management framework for customer care, according to an embodiment.

Turning ahead in the drawings, FIG. 3 illustrates a block diagram of a system 300 that can be employed for implementing an incident management platform. In many embodiments, implementing the incident management platform can include automatically recording in real-time a new record of a present interaction, according to an embodiment. In many embodiments, an incident management platform can integrate the functionality used in multiple computer systems displayed on a user interface of an associate device, similar to using associate devices 370-371 (FIG. 3). System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a management platform server 310, a web server 320, and/or a physical stores system 325. In some embodiments, associate devices 370-371 can be part of system 300, as well. Management platform server 310, web server 320, and/or physical stores system 325 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, management platform server 310, web server 320, and/or physical stores system 325. Additional details regarding management platform server 310, web server 320, and/or physical stores system 325 are described herein.

In a number of embodiments, each of management platform server 310, web server 320, and/or physical stores system 325 can be a special-purpose computer programmed specifically to perform specific functions not associated with a general-purpose computer, as described in greater detail below.

In some embodiments, web server 320 can be in data communication through Internet 330 with one or more user computers, such as user computers 340 and/or 341 and associate devices 370 and/or 371. Internet 330 can be a public or private network. In some embodiments, user computers 340-341 can be used by users, such as users 350 and 351, which also can be referred to as customers, in which case, user computers 340 and 341 can be referred to as customer computers. In several embodiments, associate devices 370-371 can be used by associates, such as associates 380 and 381, which also can be referred to as employees, in which case, associate devices 370 and 371 can be referred to as employee computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In several embodiments, physical stores system 325 can be in data communication with the point-of-sale systems in physical stores, such as physical store 360 and/or physical store 361. In many embodiments, physical stores 360-361 each can be a physical store, such as a brick-and-mortar store, that is associated (e.g., operated by a common business entity or entities under common control) with the website hosted by web server 320. In many embodiments, many of the items sold at the physical stores (e.g., 360-361) can be the same as the items sold on the website. In some embodiments, physical stores system 325 can be a distributed system that includes one or more systems in each of the physical stores (e.g., 360-361). In other embodiments, physical stores system 325 can be a centralized system that communicates with systems in the physical stores (e.g., 360-361). In several embodiments, physical stores system 325 can track orders made by users (e.g., 350-351) in the physical stores (e.g., 360-361).

In some embodiments, an internal network that is not open to the public can be used for communications between management platform server 310, web server 320, and/or physical stores system 325 within system 300. Accordingly, in some embodiments, management platform server 310, web server 320, and/or physical stores system 325 (and/or the software used by such systems) can refer to a back end of system 300, which can be operated by an operator and/or administrator of system 300, and web server 320 (and/or the software used by such system) can refer to a front end of system 300, can be accessed and/or used by one or more users, such as users 350-351, using user computers 340-341, respectively and can be accessed and/or used by one or more associates, such as associates 380-381, using associate devices 370-371, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 and/or associate devices 370-371 can be desktop computers, laptop computers, a mobile device, and/or other endpoint devices used by one or more users 350 and 351 and/or one or more associate devices 370-371, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, management platform server 310, web server 320, and/or physical stores system 325 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to management platform server 310, web server 320, and/or physical stores system 325, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of management platform server 310, web server 320, and/or physical stores system 325. In a similar manner, the processors and/or the non-transitory computer-readable media can be local and/or remote to each other.

Meanwhile, in many embodiments, management platform server 310, web server 320, and/or physical stores system 325 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between management platform server 310, web server 320, and/or physical stores system 325, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, management platform server 310 can be a general-purpose computer or a special-purpose computer programmed to perform specific functions and/or applications. For example, management platform server 310 can generate an incident report received from a user, send out an application programming interface (API) request to a management platform server, prior to assigning the incident report to an associate (e.g., 380-381) based on the historical records of past transactions of the user (e.g., 350-351 FIG. 3) with one or more interactions with one or more associates.

Figure 4:
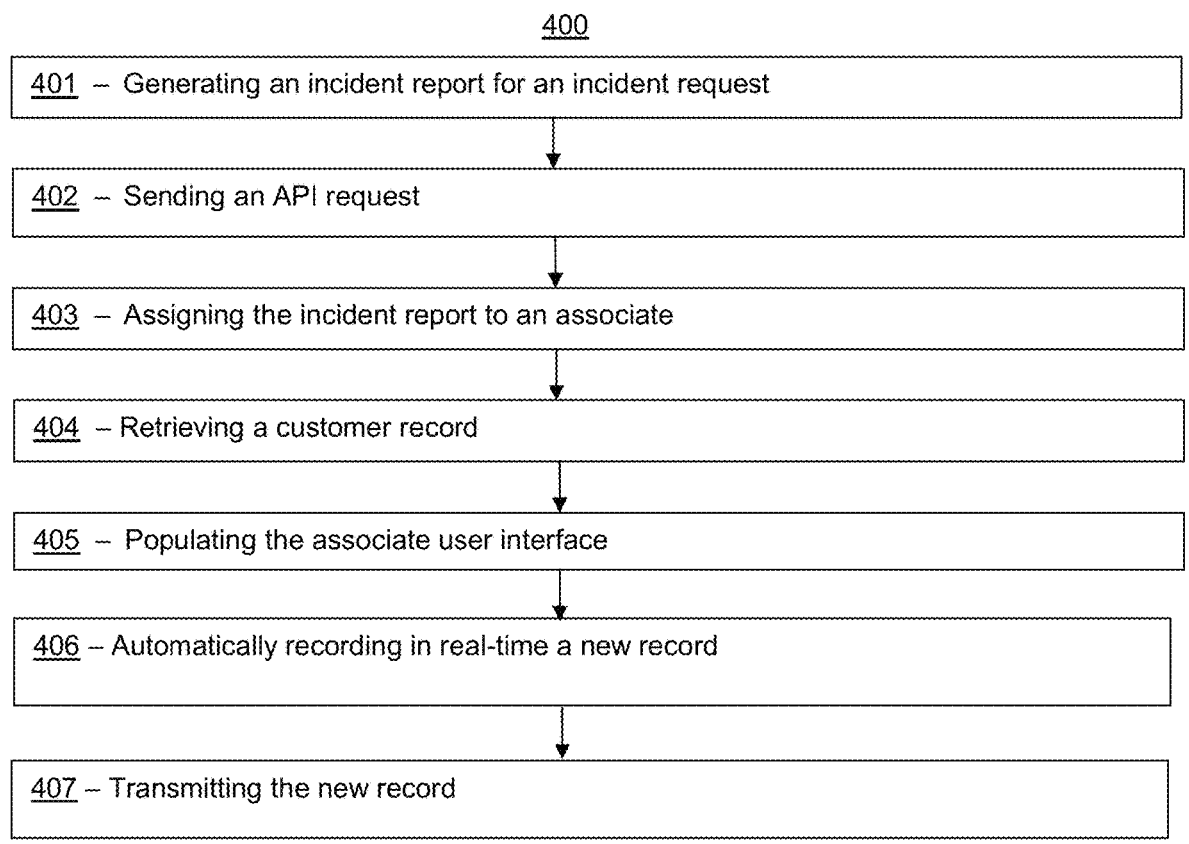
FIG. 4 illustrates a flow chart for a method, according to another embodiment.

Turning ahead in the drawings, FIG. 4 illustrates a flow chart for a method 400, according to another embodiment. In some embodiments, method 400 can be a method of implementing an incident management platform. In many embodiments, implementing the incident management platform can include automatically recording in real-time all of the intermediate communications between a user (e.g., 350-351 (FIG. 3)) and an associate (e.g., 380-381 (FIG. 3)) based on historical records for the user. In several embodiments, one or more intermediate communications between a user (and an associate based on historical records for the user can include previous interactions with one or more associates. In many embodiments, the associate can use an interactive incident management platform displayed on the interface of an associate device (e.g., 370-371 (FIG. 3)). Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as management platform server 310, web server 320, and/or physical stores system 325. The processor(s) can be similar or identical to the processor(s) described above with respect to computer system 100 (FIG. 1).

Referring to FIG. 4, method 400 can include a block 401 of generating an incident report for an incident request received from a user device of a user. In several embodiments, generating an incident report for the incident request can include receiving an incident request through one or more contact channels. In a number of embodiments, receiving the incident request through one or more contact channels can include receiving an interactive voice response (IVR), a short message service (SMS), a voice interactions with a ChatBot, email, social media and other suitable contact channels. In some embodiments, generating an incident report for an incident request can include receiving the incident request from a user device of a user.

In various embodiments, generating an incident report for an incident request received from a user device of a user that can include evaluating a response to the incident request. In many embodiments, evaluating a response to the incident request can include determining the purpose of the incident request, such as a complaint about an order. In a number of embodiments, generating an incident report for an incident request received from a user device of a user can include mapping the incident request to a data access object (DAO) for assignment to the associate device.

In several embodiments, method 400 can include a block 402 of sending an application programming interface (API) request to a management platform for customer care to identify the user. In some embodiments, sending an API request to the management platform for customer care can be similar to using management platform server 310 (FIG. 3).

Figure 12:
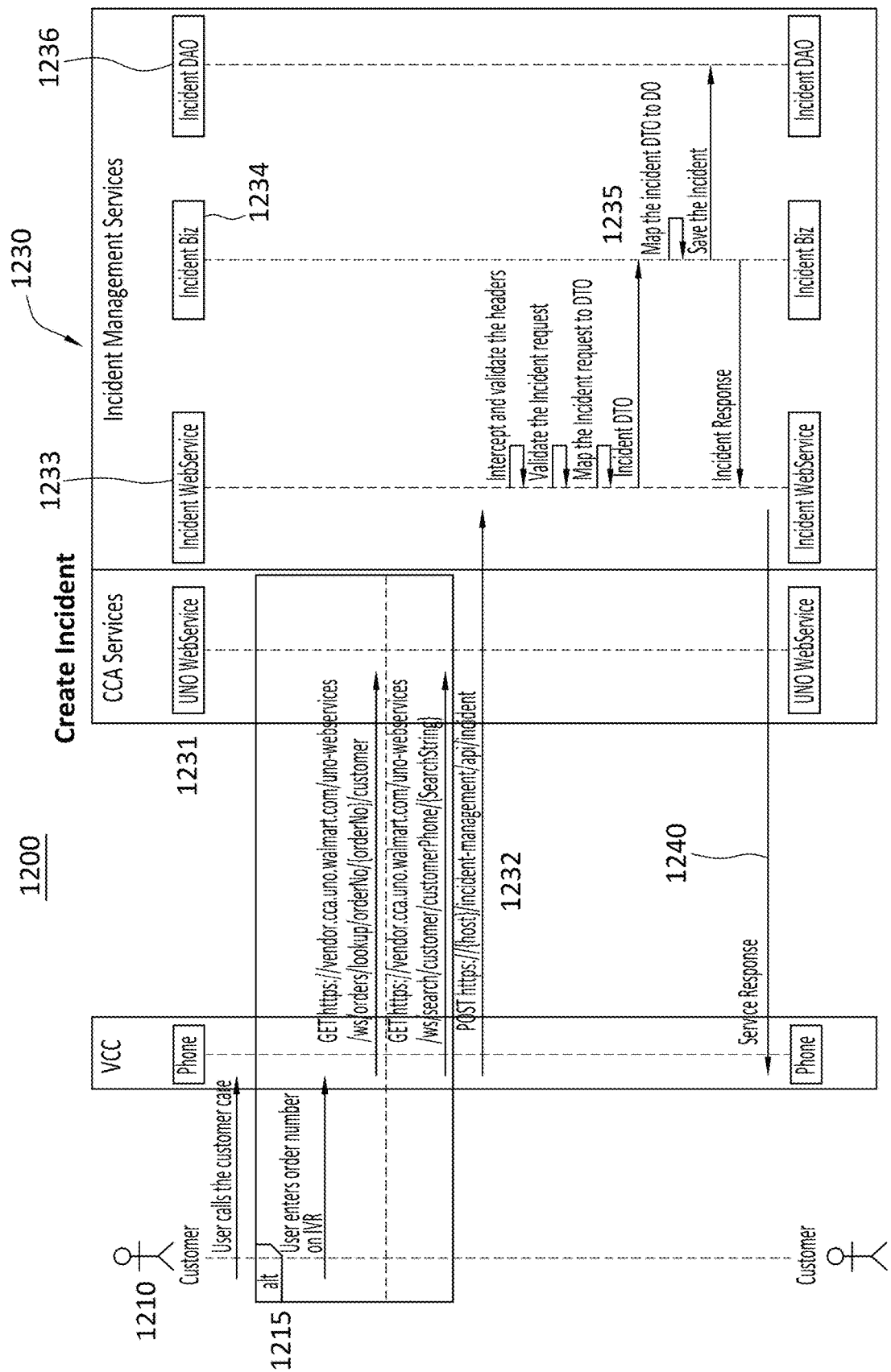
FIG. 12. illustrates a flow chart for a method, according to another embodiment.

In many embodiments, method 400 can include a block 403 of assigning the incident report to an associate user interface of an associate device of an associate. In some embodiments, assigning the incident report to the associate can include confirming the identity of the user, as shown in FIG. 12 and described below.

In a number of embodiments, method 400 can include a block 404 of retrieving a customer record associated with the user from a database of the management platform for customer care. In many embodiments, retrieving the customer record associated with the user can include historical interactions between the user and the system. In some embodiments, the historical interactions can include systematic recordings of historical intermediate communications automatically recorded by the system while the user was interacting with one or more previous associates.

In several embodiments, method 400 can include a block 404 of retrieving a customer record associated with the user from a database of the management platform for customer care. In some embodiments, retrieving the customer record can include retrieving historical interactions between the user and the system. In many embodiments, retrieving the historical interactions can include records of systematic recordings of historical intermediate communications automatically recorded by the system while the user was interacting with one or more previous associates. In several embodiments, receiving systematic recordings of historical intermediate communications can include receiving streaming data.

In various embodiments, block 404 of retrieving the customer record associated with the user from a database of the management platform for customer care can include searching the management platform for customer care using one or more associate identification numbers of one or more associates for one or more records. In some embodiments, searching the management platform for one or more records can include searching for one or more historical interactions between the user and the one or more associates.

In several embodiments, block 404 of retrieving a customer record associated with the user from a database of the management platform for customer care can include retrieving one or more associate notes entered by one or more associates. In some embodiments, retrieving one or more associate notes entered by one or more associates can include retrieving details of the one or more historical interactions between the user and the one or more associates corresponding to recurring matter in the incident request. In many embodiments, retrieving details of the one or more historical interactions between the user and the one or more associates can include displaying a date and time of an interaction between the user and the one or more associates. In various embodiments, retrieving details of the one or more historical interactions between the user and the one or more associates can include displaying comments by the one or more associates. In a number of embodiments, retrieving details of the one or more historical interactions between the user and the one or more associates can include displaying a resolution to the incident request entered by the one or more associates.

In some embodiments, method 400 can include a block 405 of populating the associate user interface with the customer records. In various embodiments, populating the associate user interface with the customer records can include transmitting to the associate user interface a record of one or more interactive voice response (IVR) options previously entered by the user. In many embodiments, populating records of one or more IVR options can include automatically storing the interaction using the management platform for customer care.

In several embodiments, block 405 of populating the associate user interface with the customer records can include receiving by the associate user interface one or more records of communications between the user and the one or more associates. In some embodiments, populating the associate user interface with the customer records can include displaying one or more records of communications between the user and the one or more associates that can be previously recorded, via clickstream data, on the management platform for customer care. In many embodiments, previously recording the clickstream data can include storing the clickstream data in the database of the management platform for customer care.

In some embodiments, block 405 of populating the associate user interface with the customer records can include receiving by the associate user interface one or more transcriptions of previous communications between the user and one or more associates. In several embodiments, populating the associate user interface with the customer records with one or more transcripts can include displaying short message server ("SMS") text communications, emails, and one or more social media messages. In various embodiments, populating transcripts of previous communications can include displaying one or more social media messages received via one or more social media platforms. In a number of embodiments, populating the associate user interface with the customer records can include displaying one or more transcriptions of previous communications between the user and one or more associates recorded by the management platform for customer care. In several embodiments, populating the associate user interface with the customer records with one or more transcriptions of previous communications between the user and one or more associates can include retrieving the communications stored in the database of the management platform for customer care.

In some embodiments, method 400 can include a block 406 of automatically recording in real-time a new record of a present interaction between the associate and the user for the incident report. As an example, the real-time automatic recording of the new record can include automatically recording, in real time, actions that the agent takes within the system while the agent is interacting with the customer and even after the interaction ends. In many embodiments, automatically recording in real-time a new record of a present interaction, the new record can include recording, in real time, intermediate communications between the user and the associate and one or more responses to the incident request by the associate. In many embodiments, automatically recording in real-time the new record can include recording, in real time, intermediate communications between the user and the associate. In several embodiments, automatically recording in real-time the new record can include recording, in real time, one or more responses to the incident request entered by the associate. In some embodiments, automatically recording in real-time the new record can include recording, in real time, notes corresponding to the incident request entered by the associate. In a number of embodiments, automatically recording in real-time the new record can include recording, in real time, notes corresponding to the incident request between the associate and another associate entered by the associate. In a number of embodiments, automatically recording in real-time the new record can include recording, in real time, recorded emails corresponding to the incident request between the associate and another associate entered by the associate. In a number of embodiments, automatically recording in real-time the new record can include recording, in real time, recorded messages corresponding to the incident request between the associate and another associate entered by the associate.

In various embodiments, block 406 of automatically recording in real-time a new record of a present interaction between the associate and the user for the incident report can include updating, in real time, the incident request. In many embodiments, automatically recording in real-time a new record of a present interaction between the associate and the user for the incident report can include tagging, in real time, the incident request as pending a resolution. In several embodiments, automatically recording in real-time a new record of a present interaction between the associate and the user for the incident report can include recording, in real time, a new record of a present interaction between the associate and another associate for the incident report during the interaction with the user. In several embodiments, automatically recording in real-time a new record of a present interaction between the associate and the user for the incident report can include recording, in real time, a new record of a present interaction between the associate and another associate for the incident report after the interaction with the user has been terminated. In some embodiments, automatically recording in real-time a new record of a present interaction between the associate and the user for the incident report can include updating, in real time, the incident request with supplemental information related to a final resolution of the incident request.

In many embodiments, block 406 of automatically recording in real-time a new record of a present interaction between the associate and the user for the incident report can include adding, in real time, an event to the incident report. In some embodiments, automatically recording in real-time a new record of a present interaction between the associate and the user for the incident report can include cancelling, in real time, an order. In several embodiments, automatically recording in real-time a new record of a present interaction between the associate and the user for the incident report can include creating, in real time, a note in the new record of the present interaction by the associate device. In various embodiments, automatically recording in real-time a new record of a present interaction between the associate and the user for the incident report can include executing, in real time, the event pursuant to instructions recorded on the interface of the associate device.

In several embodiments, method 400 can include a block 407 of transmitting the new record for storage in the database of the management platform for customer care. Additionally, in some embodiments, block 407 can include transmitting the new record to be displayed on a user interface of an associate device such that the associate can review the new record. In some embodiments, block 407 can include transmitting the new record to an incident report and/or storing the new record with the incident report. The actions within block 407 can be performed in an automatic manner.

Figure 5:
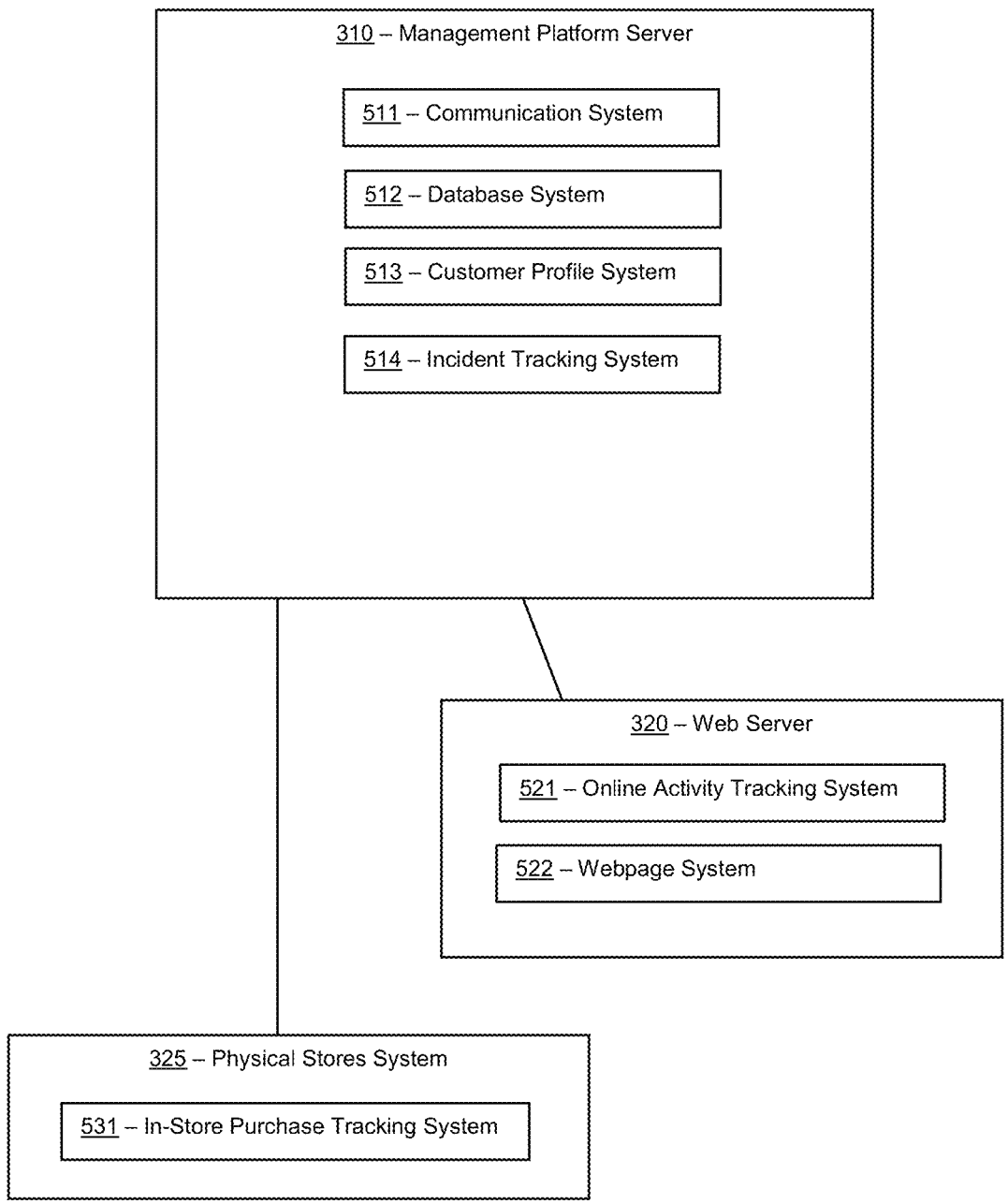
FIG. 5 illustrates a representative block diagram of the system of FIG. 3.

Turning to the next drawing, FIG. 5 illustrates a block diagram of system 300, according to the embodiment shown in FIG. 3. Management platform system 310, web server 320, and/or physical stores system 325 are merely exemplary and are not limited to the embodiments presented herein. Management platform system 310, web server 320, and/or physical stores system 325 can be employed in many different embodiments or examples not specifically depicted or described herein. In some embodiments, certain elements or systems of management platform system 310, web server 320, and/or physical stores system 325 can perform various procedures, processes, and/or acts. In other embodiments, the procedures, processes, and/or acts can be performed by other suitable elements or systems. In many embodiments, the systems of management platform system 310, web server 320, and/or physical stores system 325 can be modules of computing instructions (e.g., software modules) stored at non-transitory computer readable media. In other embodiments, the systems of management platform system 310, web server 320, and/or physical stores system 325 can be implemented in hardware.

In many embodiments, management platform system 310 can include a communication system 511. In a number of embodiments, communication system 511 can at least partially perform block 401 (FIG. 4) of generating an incident report for an incident request received from a user device of a user, the incident request received through one or more contact channels, block 402 (FIG. 4) of sending an application program interface (API) request to a management platform for customer care to identify the user, block 403 (FIG. 4) of assigning the incident report to an associate user interface of an associate device of an associate, block 406 (FIG. 4) of automatically recording in real-time a new record of a present interaction between the associate and the user for the incident report, block 407 (FIG. 4) of transmitting the new record for storage in the database of the management platform for customer care, block 1210 (FIG. 12, described below) of receiving an incident request from a user to a customer care website, block 1215 (FIG. 12, described below) of receiving an incident request from a user to a customer care website using an interactive voice response approach, block 1232 (FIG. 12, described below) of sending a second API request to an incident web service, a block 1240 (FIG. 12, described below) of sending a service response to the user and/or block 1510 (FIG. 15, described below) of adding an event to an incident report by the associate In several embodiments, management platform system 310 also can include a database system 512. In various embodiments, database system 512 can at least partially perform block 404 (FIG. 4) of retrieving a customer record associated with the user from a database of the management platform for customer care, block 405 (FIG. 4) of populating the associate user interface with the customer record and/or 407 (FIG. 4) of transmitting the new record for storage in the database of the management platform for customer care.

In some embodiments, customer profile system 310 also can include a customer profile system 513. In many embodiments, customer profile system 513 can at least partially perform block 402 (FIG. 4) of sending an application program interface (API) request to a management platform for customer care to identify the user, 405 (FIG. 4) of populating the associate user interface with the customer record, block 1410 (FIG. 14, described below) of updating an incident report entered by the associate and/or block 1231 (FIG. 12, described below) of sending a first API request to a customer care service platform.

In some embodiments, management platform system 310 also can include an incident tracking system 514. In many embodiments, incident tracking system 514 can at least partially perform block 401 (FIG. 4) of generating an incident report for an incident request received from a user device of a user, the incident request received through one or more contact channels, block 406 (FIG. 4) of automatically recording in real-time a new record of a present interaction between the associate and the user for the incident report, block 1230 (FIG. 12, described below) of displaying a flow chart creating an incident report, block 1233 (FIG. 12, described below) of processing an incident request using the incident web service, a block 1234 (FIG. 12, described below) of receiving the incident request transmitted by the DTO to the DAO, block 1235 (FIG. 12, described below) of mapping the incident request from the DTO to the DAO, block 1236 (FIG. 12, described below) of sending a service response to the user, block 1310 (FIG. 13, described below) of assigning the user to an associate, block 1420 (FIG. 14, described below) of recording the updated incident report entered by the associate, block 1520 (FIG. 15, described below) of recording the event details of the incident report to the DAO, block 1610 (FIG. 16, described below) of adding a note to the incident report entered by the associate, block 1710 (FIG. 17, described below) of searching for the incident report by an identification number, and/or block 1720 (FIG. 17, described below) of retrieving the incident report from the DO.

In a number of embodiments, web server 320 can include an online activity tracking system 521. In many embodiments, online activity tracking system 521 can at least partially perform gathering information regarding online orders that is provided to database system 512, customer profile system 513, and/or incident tracking system 514.

In several embodiments, web server 320 can include a webpage system 522. Webpage system 522 can at least partially perform sending instructions to user computers (e.g., 350-351 (FIG. 3)) and/or associate devices (e.g., 370-371 (FIG. 3)) based on information received from communication system 511.

In some embodiments, physical stores system 325 can include an in-store order tracking system 531. In-store order tracking system 531 can at least partially perform gathering information regarding in-store orders of a user and other users to be provided to database system 512, customer profile system 513, and/or incident tracking system 514.

Figure 6:
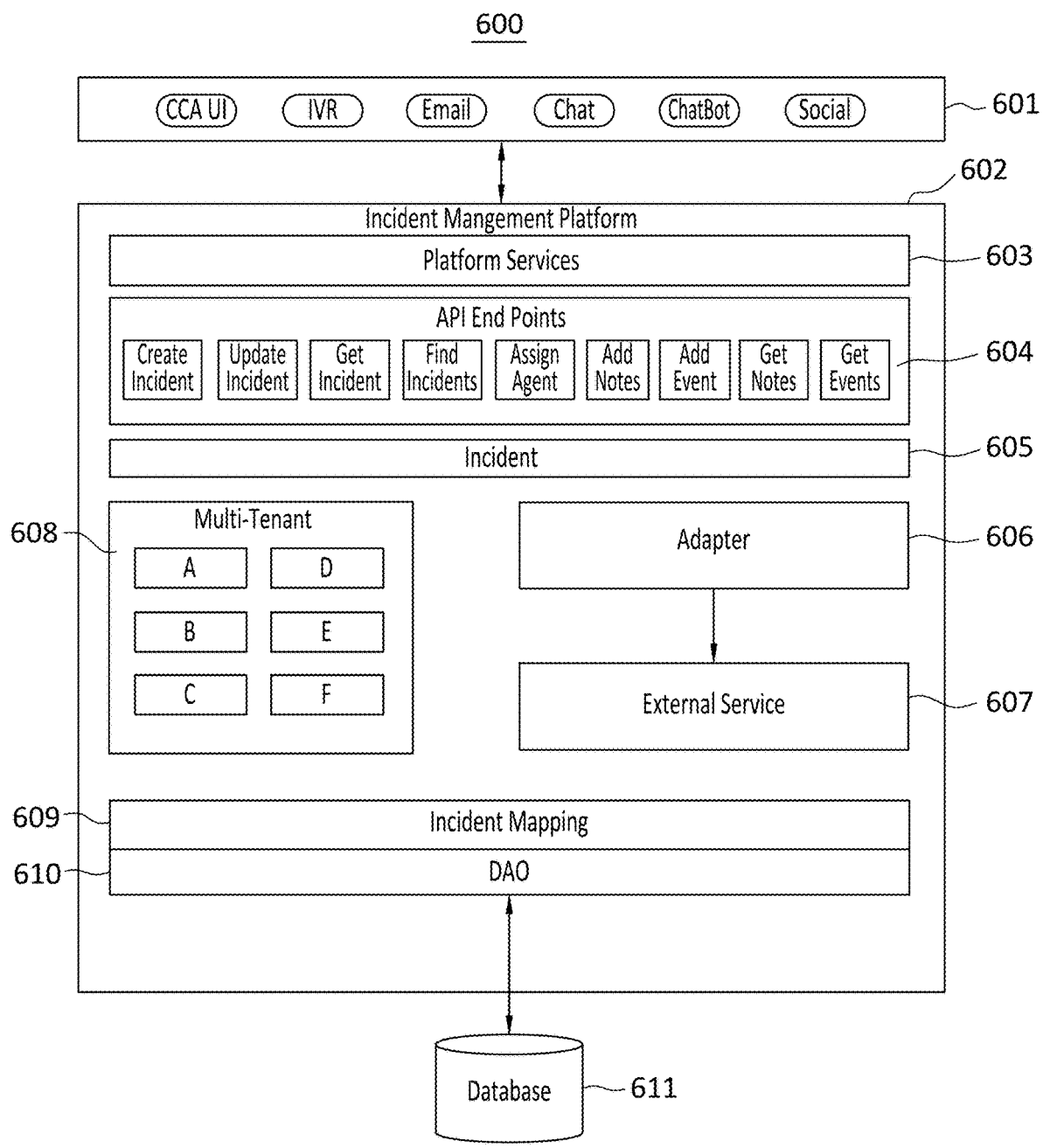
FIG. 6 illustrates an exemplary architecture interface of a computer system, according to another embodiment.

Turning ahead in the drawings, FIG. 6 illustrates an exemplary computer architecture interface display 600 of an incident management platform of a computer system. Computer architecture interface display 600 is merely exemplary, and embodiments of incident management framework for user care can be employed in many different embodiments or examples not specifically depicted or described herein. In several embodiments, computer architecture interface display 600 can include a contact channel bar 601, an incident management platform 602, a platform services bar 603, an API endpoints bar 604, an incident bar 605, an adapter bar 606, an external services bar 607, a tenant bar 608, an incident mapping bar 609, and a DAO bar 610. Contact channel bar 601 and incident management platform 602 (and its components) can communicate with a database 611.

In many embodiments, contact channel bar 601 can indicate one or more modules programmed to receive a user incident request by one or more communication methods including CCA UI (Customer care user interface), IVR, email, Chat and/or Chatbox, Social media and/or other suitable contact methods. In several embodiments, upon receiving a user request through one or more contact channels, the incident management system can be initiated. In various embodiments, receiving a request using an incident management system can reduce handling time between the user and an associate providing end-to-end visibility into historical interactions of the user with one or more associates for one or more incident reports. In several embodiments, historical interactions of the user can include intermediate recordings in various formats recording all actions taken during each interaction.

In several embodiments, incident management platform 602 can indicate one or more modules programmed to manage the integration of a customer service care system and an incident reporting system. In many embodiments, the incident management platform can include implementing one or more functionalities of one more computer capabilities programmed to run on the incident management platform, such as used in a computer processing unit (CPU).

In some embodiments, platform services bar 603 can indicate one or more modules programmed to interface with the internet (e.g., similar to using web server 320) programmed to receive communications from a user by means of the platform services. In several embodiments, providing an interface with the online sources can include intercepting requests transmitted from the online sources using the platform services. In many embodiments, providing an interface with the online sources can include confirming a user communication received from the online sources using the platform services.

In many embodiments, API endpoints bar 604 can indicate one or more modules programmed to implement one or more API endpoints. In some embodiments, implementing API endpoints can include receiving an API request. In several embodiments, implementing API endpoints can include creating an incident. In many embodiments, implementing API endpoints can include updating an incident. In some embodiments, implementing API endpoints can include retrieving (e.g., getting) an incident using an associate identification (ID) number from a database (e.g., cache). In several embodiments, implementing API endpoints can include finding incidents from historical interactions between the user and associates. In many embodiments, implementing API endpoints can include finding incidents from historical interactions between the user and a particular associate that has previously interacted with the user for the same and/or a similar issue. In some embodiments, implementing API endpoints can indicate one or more modules programmed perform multiple tasks indicated during the interaction between a user and an associate and/or between an associate and another associate. In many embodiments, performing multiple tasks can be performed in real-time and/or simultaneously with other API endpoints. In various embodiments, performing multiple tasks can include assigning the incident request of a user to an associate, adding a note to an incident report by an associate that can include behind the scene details of each interaction with the user, adding an event to the record, such as a request to cancel an order, retrieving notes of previous interactions between the user and the associate, retrieving records of events requested by the user as part of addressing a customer service issue and/or other suitable API endpoint tasks.

In many embodiments, implementing API endpoints can include interacting with one or more other endpoints, such as a web service endpoint or a web address (URL). In various embodiments, implementing API endpoints by receiving an API request can include using a representational state transfer (REST) API endpoint. In several embodiments, implementing API endpoints can include searching for historical incident reports simultaneously during an interaction with a user.

In several embodiments, incident bar 605 can indicate one or more modules programmed to process one or more channels of information can include using an incident business layer. In many embodiments, using an incident business layer can include encoding business rules, business restrictions, calculations, and/or other suitable applications based on business logic.

In some embodiments, adapter bar 606 can indicate one or more modules programmed to manage the multi-channel system by ensuring incident reports and intermediate communications can be transmitted, stored, and kept intact as part of the aggregated historical records of a user via an adapter.

In various embodiments, external services bar 607 can indicate one or modules programmed to update incident records that failed to sync with the incident management system during a batch job. In several embodiments, updating incident records can including batching the records during a period time, such as a day, a week, and/or another suitable period of time. In many embodiments, updating incident records can include querying the incident reports that failed to sync from a database, such as an incident management database. In some embodiments, retrieving the incident reports that failed to sync can include processing the incident records to sync the failed records to an external service then returning (e.g., posting) the incident records by running an incident management replay batch to store the records in the incident management system.

In a number of embodiments, tenant bar 608 can indicate one or more modules programmed to address user incident request relating to one or more tenants integrated within a multi-tenant system identified by the user.

In several embodiments, incident mapping bar 609 can indicate one or more modules programmed to map data to incident reports using a mapping model. In many embodiments, mapping data to incident reports can include using an incident common object model. In some embodiments, mapping data to incident reports can include, creating the incident report then sending (e.g., transmitting) the data to a database. In some embodiments, mapping data to incident reports can include, creating intermediate communications included in the incident report. In many embodiments, creating intermediate communications included in the incident report can include behind the scenes details entered by an associate after completion of an interaction with a user. In some embodiments, creating intermediate communications included in the incident report can include behind the scenes details entered by an associate can include storing the intermediate communications, as mapped to the data in the incident report, in a database. In several embodiments, creating intermediate communications included in the incident report can include behind the scenes details entered by an associate recording interactions between the associate and another associate during the interaction with the user. In various embodiments, creating intermediate communications included in the incident report can include behind the scenes details entered by the associate recording interactions between the associate and another associate after the interaction with the user has terminated.

In many embodiments, DAO bar 610 can indicate one or more modules programmed to interface with a data access object (DAO) for mapping application calls to a database. In some embodiments, providing the interface using DAO can include using a persistence layer to communicate between the incident management platform and the database.

In various embodiments, database 611 can comprise one or more modules programmed to automatically store data recorded of interactions between a user and an associate and/or interactions between an associate and another associate based on the incident records. In many embodiments, the data recorded can be mapped to a user, an incident report number, an associate identification, and/or another suitable related method of mapping, and stored in a database, such as a cloud database.

Figure 7:
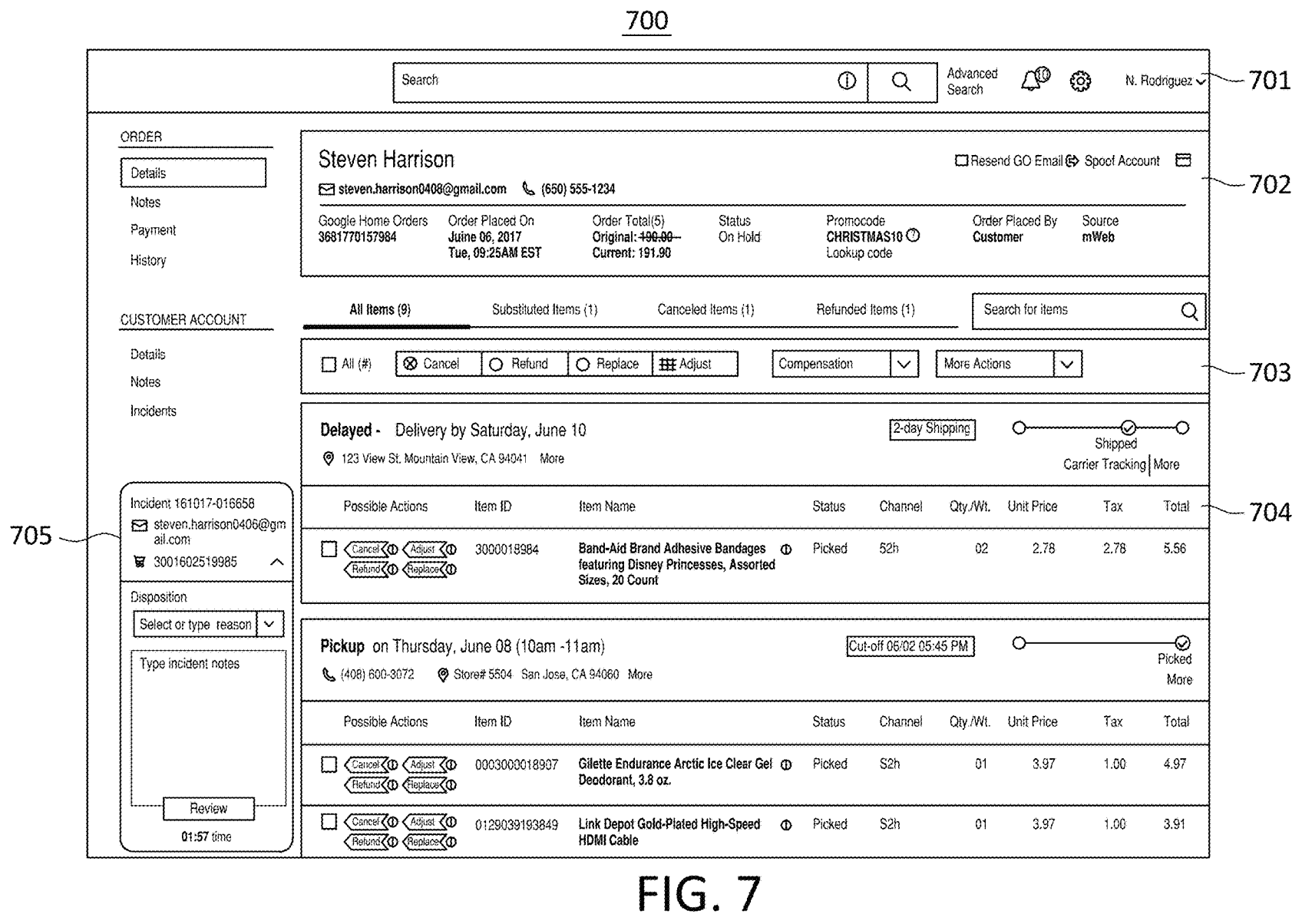

Referring to the drawings, FIG. 7 illustrates an exemplary user interface display 700 showing a webpage of a website. User interface display 700 is merely exemplary, and embodiments of an incident management framework for user care can be employed in many different embodiments or examples not specifically depicted or described herein. In several embodiments, user interface display 700 can include a search bar 701, a user information bar 702, an action bar 703, a historical incidents bar 704, and/or an assignment bar 705.

In some embodiments, search bar 701 can indicate an associate has logged on to the incident management system. In many embodiments, the search bar can be programmed to perform searches for information that can be related to the incident request by the associate during an interaction with a user and/or another associate. In various embodiments, performing searches for information can include searching for one or more intermediate communications of one or more historical records of the user. In a number of embodiments, searching for one or more intermediate communications of one or more historical records of the user can include information located in communications between an associate and another associate. In many embodiments, communications between an associate and another associate can include communications during the interaction with the user, such as text or email discussions with another associate displayed on the user device. In some embodiments, communications between an associate and another associate can include communications after the interaction has been terminated and/or a follow up communication for an open matter, such as a pending a resolution status. In several embodiments, the search bar can be programmed to display an associate identification as another method of tracking all intermediate communications during the interaction between the user and the associate and/or an associate and another associate.

In many embodiments, user information bar 702 can indicate a user has been assigned to an associate by displaying user information and contact information associated with an incident report and/or a user account. In some embodiments, user information bar can indicate a method the user chose to use, such as one or more contact channels. In many embodiments, displaying information of the user can include details of the current issue that is the subject of the incident request, such a status of an order. In some embodiments, displaying information of the user also can include presenting a status of a previous interaction with the intermediate details of the last interaction.

In several embodiments, action bar 703 can indicate one or more dispositions for the current incident request has been entered by an associate during a previous interaction concerning a previous incident request. In many embodiments, action bar 703 can indicate a selection of programmed disposition options available to an associate to enter during and/or after the interaction with the user. In several embodiments, the selection of programmed dispositions can be presented in a menu of events (e.g., actions). In many embodiments, presenting action bar 703 on the associate device can be included in each historical record of each interaction with the user. For example, receiving an incident request from a user for a complaint can result in sending the user a $100 gift card from an associate. After a few weeks, another incident request from a user for a complaint can result in sending the user another $100 gift card, however an associate can track the disposition for each incident report and detect whether a pattern of a fraudulent activity exists.

In some embodiments, historical incidents bar 704 can indicate an associate has accessed the history of previous incident reports of the user during an interaction with the user in real-time. In a number of embodiments, presenting historical records can include updates, intermediate communications, notes, comments, and/or other suitable information related to past transactions of the user whether an incident request was received or not. In many embodiments, presenting a history of complete orders can include displaying the history to the associate during the interaction with the user and/or after the interaction has been terminated.

In several embodiments, an assignment bar 705 can indicate the incident management platform has automatically assigned an incident request of a user to an associate device when a pop-up window appears on the interface of the associate device. In many embodiments, automatically displaying an incident request to an interface of an associate device can include presenting identification and/or demographic information of the user. In various embodiments, the pop-up window can include a menu for a disposition of the incident request. In many embodiments, the pop-up window can include presenting a window for notes entered by the associate of the interaction. In some embodiments, entering notes of the interaction between the user and the associate can include batching the notes on a periodic basis, such as each day, each week, and another suitable period of time, and storing the notes mapped to the user in a database.

Turning ahead to the drawings, FIG. 8 illustrates an exemplary user interface display 800 showing a webpage of a website. User interface display 800 is merely exemplary, and embodiments of incident management framework for user care can be employed in many different embodiments or examples not specifically depicted or described herein. In several embodiments, user interface display 800 can include a review bar 801, an action bar 802, an associate comments bar 803, and/or a comments bar 804.

In some embodiments, review bar 801 can indicate the associate and another associate can be reviewing an incident report of a user. In many embodiments, reviewing the incident report can be in real-time during the interaction with the user and/or can be after the interaction with the user has ended. In several embodiments, intermediate communications between an associate and one or more associates are automatically recorded and stored in a database. In many embodiments, presenting the incident number of the incident request in the review bar can include displaying an assigned incident number unique to each incident request. In several embodiments, presenting the incident number of the incident request can include displaying a current incident request. In various embodiments, presenting the incident number of the incident request can include displaying a historical record of an incident request.

In many embodiments, action bar 802 can indicate an associate entered actions taken for previous incident reports of the user including detailed notes of the interaction entered by an associate. In several embodiments, entering notes by the associate during an interaction between the user and the associate can include entering notes describing reasons for the event based on the user interaction.

In several embodiments, associate comments bar 803 can indicate that one or more associates have entered notes for one or more dispositions for an incident report stored as intermediate communications as part of the historical records. In many embodiments, presenting notes entered by other associates can include interactions between an associate and another associate associated with the incident request of the user.

In some embodiments, comments bar 804 can indicate the associate can enter comments and/or notes associated with the present interaction between the user and the associate.

Figure 9:
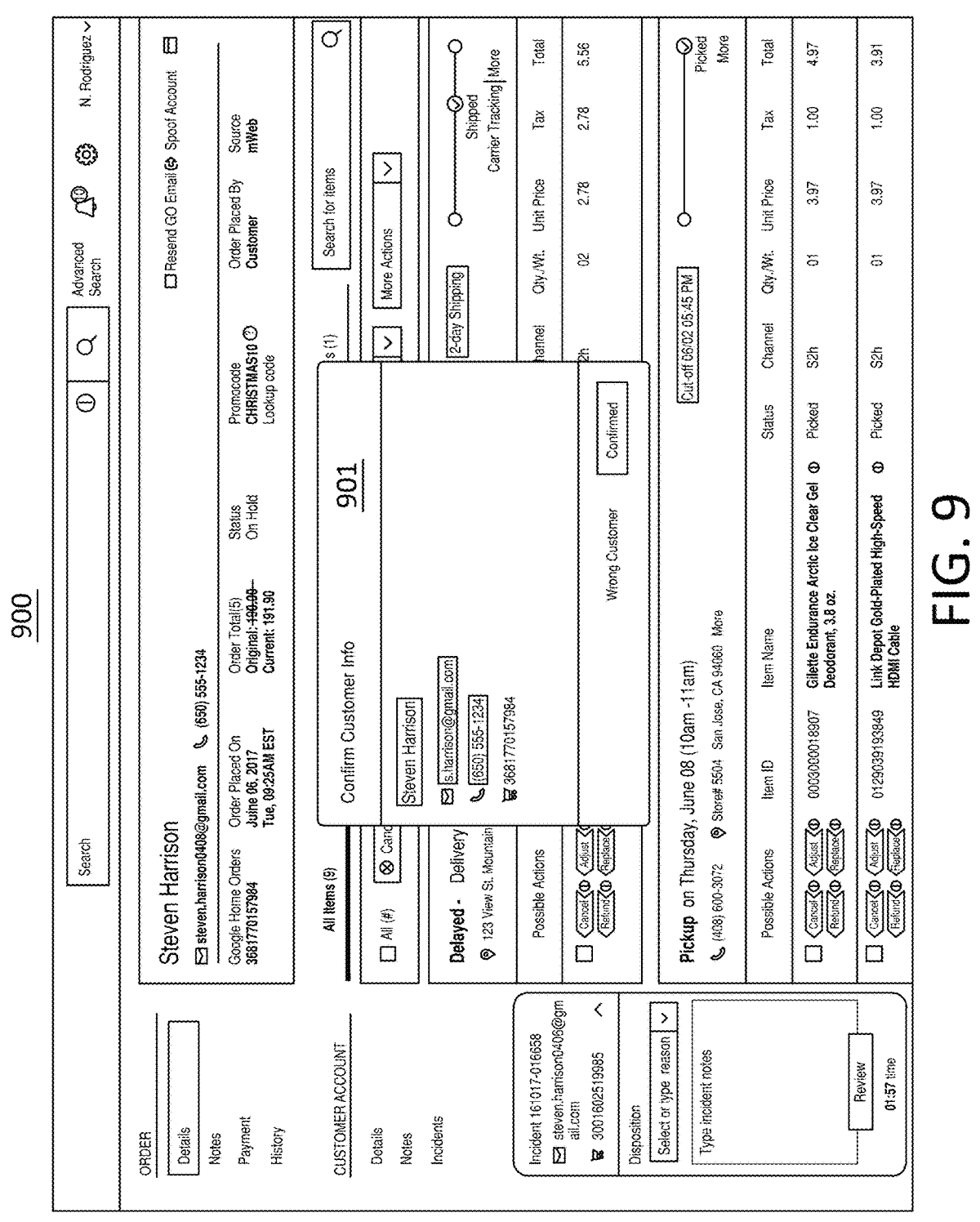

Referring to the drawings, FIG. 9 illustrates an exemplary user interface display 900 showing a webpage of a website. User interface display 900 is merely exemplary, and embodiments of incident management framework for user care can be employed in many different embodiments or examples not specifically depicted or described herein. In several embodiments, user interface display 900 can include a confirmation window 901.

In various embodiments, confirmation window 901 can indicate that an associate can be an identify of a user via a pop up window on a user interface of an associate device. In many embodiments, confirming the identification of the user can include confirming the identification information of the user prior to addressing the incident in real-time. In some embodiments, confirming the identification of the user can include determining whether the user is not the person associated with the user identification and/or the incident request. In several embodiments, determining whether the user is not the person associated with the user information displayed on the user interface can include searching for the correct user associated with the incident report. In some embodiments, searching for the correct user associated with the incident report can include requesting user information of the user and performing a search of the database to locate the correct user.

Turning ahead to the drawings, FIG. 10 illustrates an exemplary user interface display 1000 showing a webpage of a website. User interface display 1000 is merely exemplary, and embodiments of incident management framework for user care can be employed in many different embodiments or examples not specifically depicted or described herein. In several embodiments, user interface display 1000 can include a status bar 1001.

In many embodiments, method 1000 can include a block 1001 can indicate the associate is reviewing a recent order history of the user. In many embodiments, a set of historical records storing intermediate communications of previous incidents of a user can be saved for a predetermined period of time. In several embodiments, displaying historical records of previous incidents of a user can include retrieving the historical records based on an incident identification (ID) number.

Figure 11:
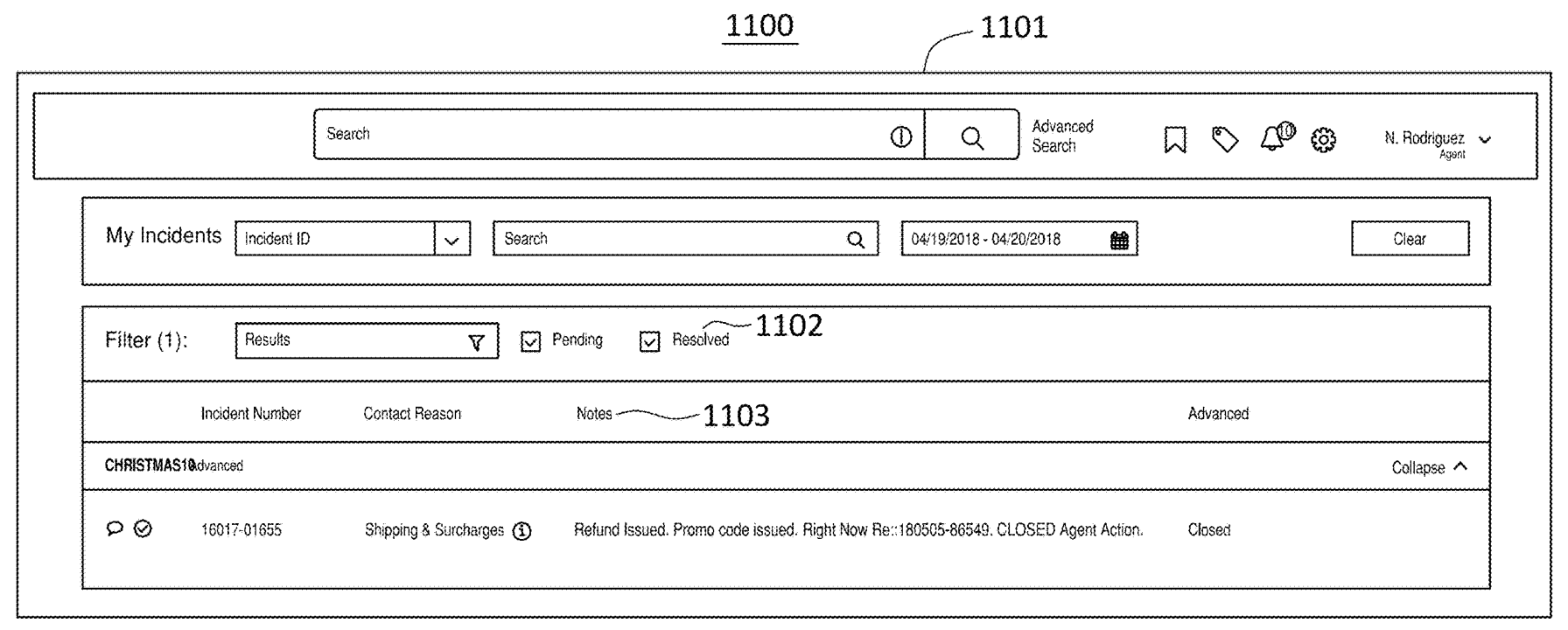

Referring to the drawings, FIG. 11 illustrates an exemplary user interface display 1100 showing a webpage of a website. User interface display 1100 is merely exemplary, and embodiments of incident management framework for user care can be employed in many different embodiments or examples not specifically depicted or described herein. In several embodiments, user interface display 1100 can include an incident page 1101, a status bar 1102, and/or a notes bar 1103.

In some embodiments, incident page 1101 can indicate an associate searched for a particular incident report of a user. In many embodiments, a user interface of an associate device can be capable of displaying multiple historical records of previous incidents of a user. In several embodiments, displaying historical records of previous incidents of a user can include retrieving the historical records based on an incident identification (ID) number. In many embodiments, retrieving the historical records based on the incident ID number can include assigning a unique number for each issue until the resolution is completed. In some embodiments, assigning a unique number for each issue until the resolution is completed can include receiving more than one incident reports based on an unresolved issue pending a resolution. In several embodiments, receiving more than one incident report based on an unresolved issue pending a resolution can include mapping the data in the incident report to the incident ID. In various embodiments, receiving more than one incident report based on an unresolved issue pending a resolution can include mapping the data in the incident report to an identification of the user. In several embodiments, receiving more than one incident report based on an unresolved issue pending a resolution can include mapping the data in the incident report to an associate identification number based on the historical incident records.

In many embodiments, status bar 1102 can indicate an associate marked an incident report of a user as pending and resolved. In many embodiments, selecting one or more dispositions of the incident request of the user can include selecting an icon for a pending status. In many embodiments, selecting one or more dispositions of the incident request of the user can include selecting an icon for a resolved status.

In several embodiments, notes bar 1103 can indicate of presenting historical notes of the disposition entered by the associate.

Turning ahead to the drawings, FIG. 12 illustrates a flow chart for a method, according to another embodiment of method 400 (FIG. 4). Method 1200 can be similar to method 400 (FIG. 4), and various procedures, processes, and/or activities of method 1200 can be similar or identical to various procedures, processes, and/or activities of method 400 (FIG. 4). Method 1200 can be employed in many different embodiments and/or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped. In several embodiments, system 300 (FIG. 3) can be suitable to perform method 1200 and/or one or more of the activities of method 1200. In these or other embodiments, one or more of the activities of method 1200 can be implemented as one or more computing instructions configured to run at one or more processors and configured to be stored at one or more non-transitory computer-readable media. Such non-transitory computer-readable media can be part of a computer system such as management platform server 310 and/or web server 320. The processor(s) can be similar or identical to the processor(s) described above with respect to computer system 100 (FIG. 1).

In some embodiments, method 1200 further can include a block 1210 of receiving an incident request from a user to a customer care website. In several embodiments, receiving an incident request from a user to a customer care website can include receiving a telephone call.

In many embodiments, method 1200 additionally can include a block 1215 of, among other things shown in FIG. 12, receiving an incident request from a user to a customer care website using an interactive voice response approach. In several embodiments, receiving an incident request from a user to a customer care website can include receiving an interaction by one or more contact channels, as shown in FIG. 5 and described above.

In several embodiments, method 1200 also can include a block 1230 of, among other things shown in FIG. 12, using an incident management services module of an incident management platform.

In some embodiments, method 1200 further can include a block 1231 of, among other things shown in FIG. 12, using a customer care services module, which can include receiving API calls from the phone of a customer. In the same or different embodiments, block 1231 also can include sending a first API request to a customer care service website (e.g., platform). In many embodiments, sending the first API request to a customer care service platform can include retrieving user information stored in the customer care database. In several embodiments, retrieving user information stored in the customer care database can include mapping the user information to the customer care database.

In various embodiments, method 1200 additionally can include a block 1232 of, among other things shown in FIG. 12, sending a second API request to an incident web service (e.g., website). In many embodiments, sending a second API request to the incident web service can include creating an incident report for the incident request of the user.

In a number of embodiments, method 1200 further also can include a block 1233 of, among other things shown in FIG. 12, processing an incident request using the incident web service. In many embodiments, processing an incident request using the incident web service can include intercepting and validating headers. In some embodiments, processing an incident request using the incident web service can include validating the incident request. In various embodiments, processing an incident request using the incident web service can include mapping the incident request to a data transfer object (DTO) to carry data between processes.

In several embodiments, method 1200 also can include a block 1234 of, among other things shown in FIG. 12, receiving the incident request transmitted by the DTO to the DAO to the incident business layer, such as used in block 605 (FIG. 6)).

In many embodiments, method 1200 further can include a block 1235 of, among other things shown in FIG. 12, mapping the incident request from the DTO to the DAO, such as used in block 610 (FIG. 6)). In several embodiments, mapping the incident request from the DAO to the DO can include saving the incident request to the DAO.

In various embodiments, method 1200 additionally can include a block 1240 of, among other things shown in FIG. 12, sending a service response to the user. In many embodiments, sending a service response to user can include simultaneously assigning the incident report to an associate.

Figure 13:
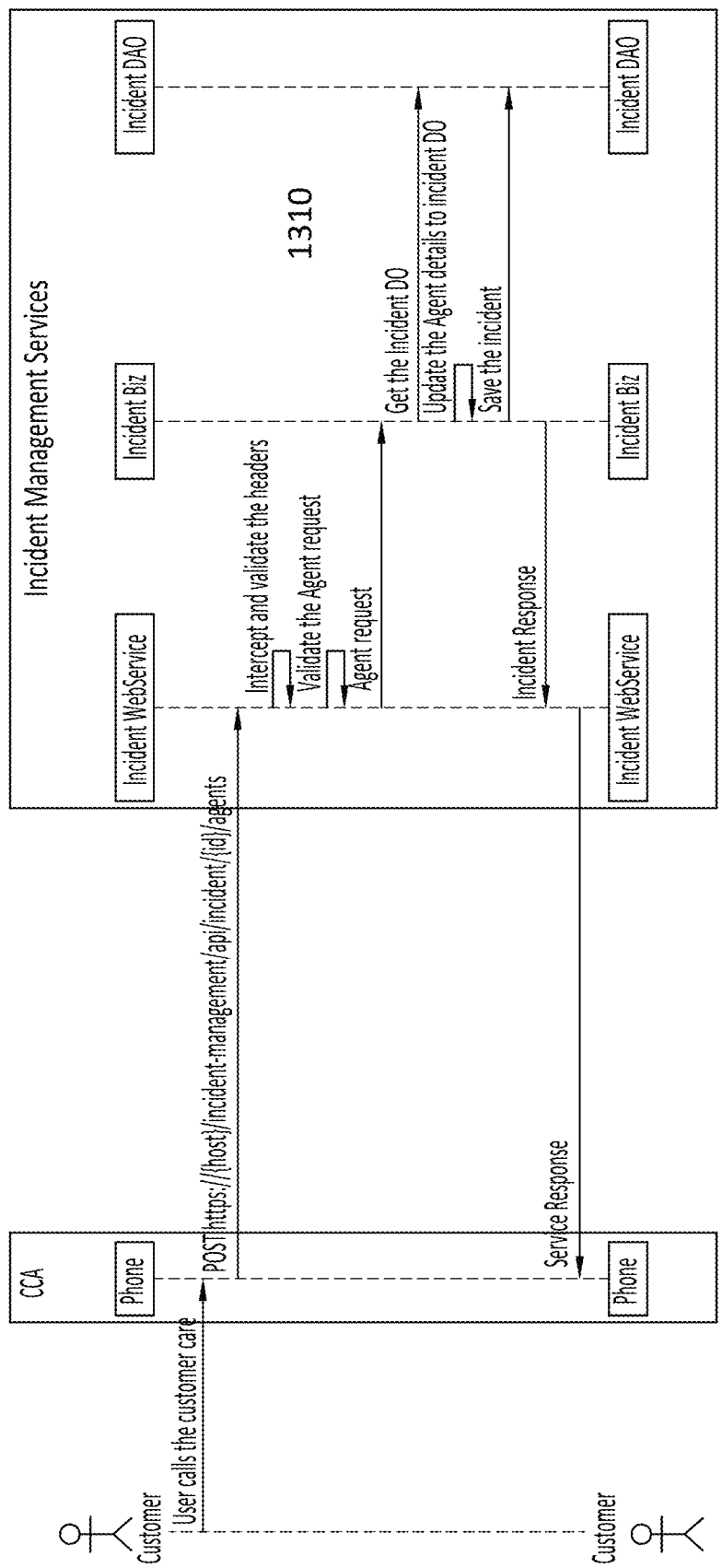
FIG. 13. illustrates a flow chart for a method, according to another embodiment.

Referring to the drawings, FIG. 13 illustrates a flow chart for a method, according to another embodiment of method 400 (FIG. 4). Method 1300 can be similar to method 400 (FIG. 4), and various procedures, processes, and/or activities of method 1300 can be similar or identical to various procedures, processes, and/or activities of method 400 (FIG. 4). Method 1300 can be employed in many different embodiments and/or examples not specifically depicted or described herein. In some embodiments, the procedures, the processes, and/or the activities of method 1300 can be performed in the order presented. In other embodiments, the procedures, the processes, and/or the activities of method 1300 can be performed in any suitable order. In still other embodiments, one or more of the procedures, the processes, and/or the activities of method 1300 can be combined or skipped. In several embodiments, system 300 (FIG. 3) can be suitable to perform method 1300 and/or one or more of the activities of method 1300. In these or other embodiments, one or more of the activities of method 1300 can be implemented as one or more computing instructions configured to run at one or more processors and configured to be stored at one or more non-transitory computer-readable media. Such non-transitory computer-readable media can be part of a computer system such as management platform server 310 and/or web server 320. The processor(s) can be similar or identical to the processor(s) described above with respect to computer system 100 (FIG. 1).

In some embodiments, method 1300 further can include a block 1310 of, among other things shown in FIG. 13, assigning the user to an associate (e.g., agent). In several embodiments, assigning the user to the associate can include retrieving (e.g., getting) the incident report from the DAO. In many embodiments, retrieving the incident report from the DAO can include updating the associate assignment (e.g., associate information) to the DAO. In several embodiments, updating the associate assign to the incident report can include saving the incident report to the DAO.

Figure 14:
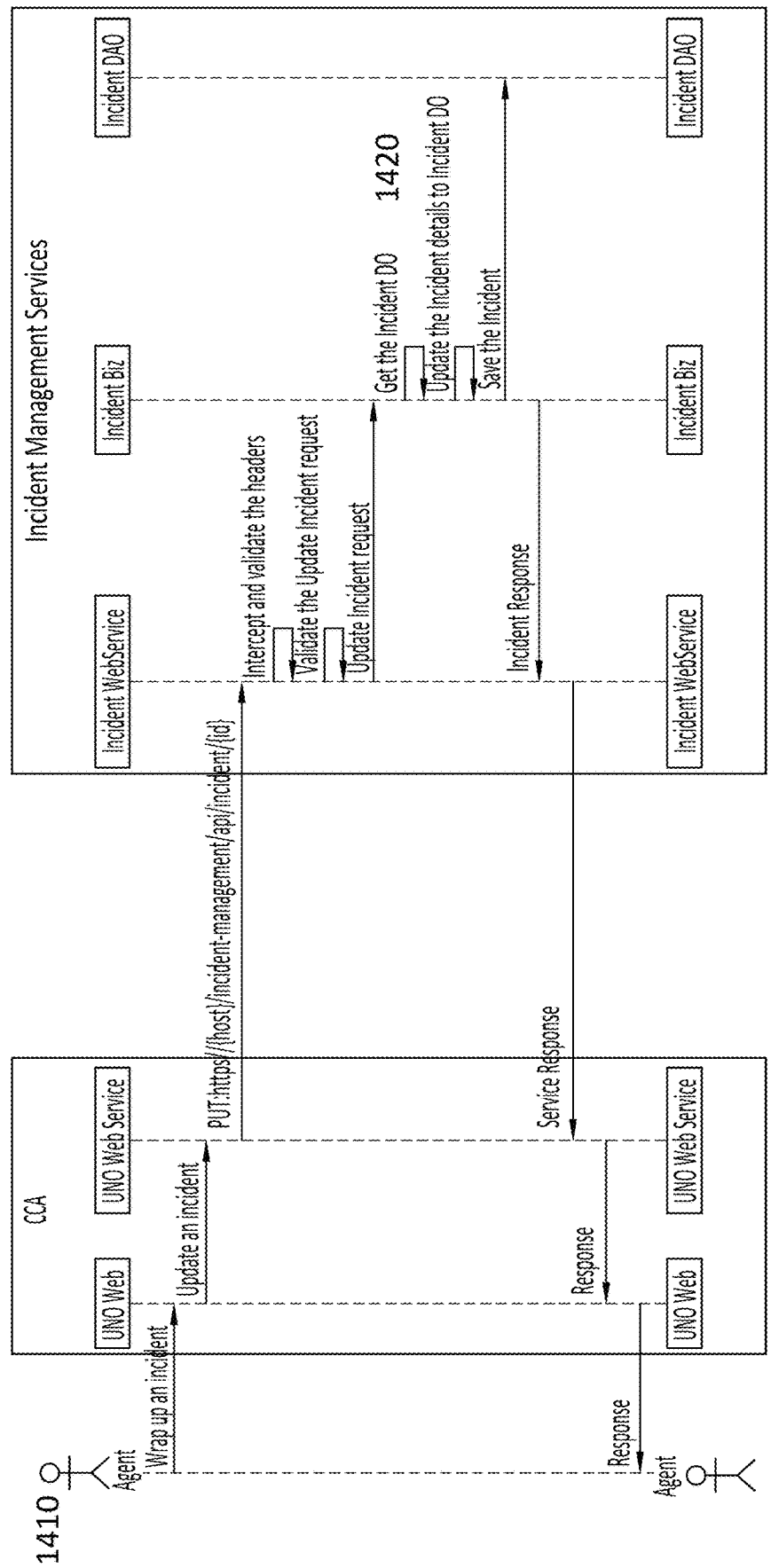
FIG. 14. illustrates a flow chart for a method, according to another embodiment.

Turning ahead to the drawings, FIG. 14 illustrates a flow chart for a method, according to another embodiment of method 400 (FIG. 4). Method 1400 can be similar to method 400 (FIG. 4), and various procedures, processes, and/or activities of method 1400 can be similar or identical to various procedures, processes, and/or activities of method 400 (FIG. 4). Method 1400 can be employed in many different embodiments and/or examples not specifically depicted or described herein. In some embodiments, the procedures, the processes, and/or the activities of method 1400 can be performed in the order presented. In other embodiments, the procedures, the processes, and/or the activities of method 1400 can be performed in any suitable order. In still other embodiments, one or more of the procedures, the processes, and/or the activities of method 1400 can be combined or skipped. In several embodiments, system 300 (FIG. 3) can be suitable to perform method 1400 and/or one or more of the activities of method 1400. In these or other embodiments, one or more of the activities of method 1400 can be implemented as one or more computing instructions configured to run at one or more processors and configured to be stored at one or more non-transitory computer-readable media. Such non-transitory computer-readable media can be part of a computer system such as management platform server 310 and/or web server 320. The processor(s) can be similar or identical to the processor(s) described above with respect to computer system 100 (FIG. 1).

In some embodiments, method 1400 further can include a block 1410 of, among other things shown in FIG. 14, updating an incident report entered by the associate.

In many embodiments, method 1400 additionally can include a block 1420 of, among other things shown in FIG. 14, recording the updated incident report entered by the associate. In several embodiments, recording the updated incident report entered by the associate can include updating the details (e.g., comments) to the DAO. In many embodiments, recording the updated details (e.g., comments) to the DAO can include saving the updated incident report to the DAO.

Figure 15:
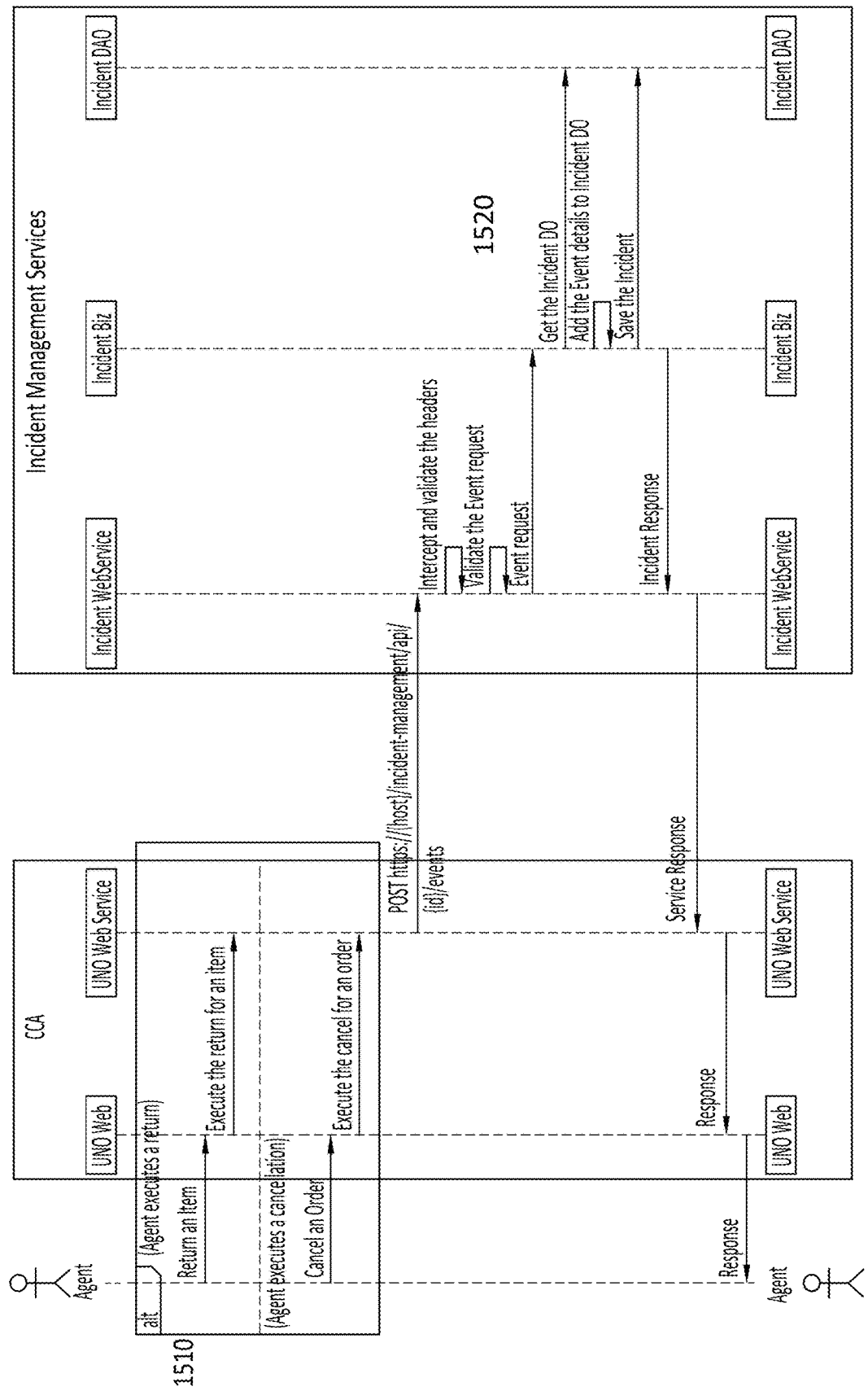
FIG. 15. illustrates a flow chart for a method, according to another embodiment.

Referring to the drawings, FIG. 15 illustrates a flow chart for a method, according to another embodiment of method 400 (FIG. 4). Method 1500 can be similar to method 400 (FIG. 4), and various procedures, processes, and/or activities of method 1500 can be similar or identical to various procedures, processes, and/or activities of method 400 (FIG. 4). Method 1500 can be employed in many different embodiments and/or examples not specifically depicted or described herein. In some embodiments, the procedures, the processes, and/or the activities of method 1500 can be performed in the order presented. In other embodiments, the procedures, the processes, and/or the activities of method 1500 can be performed in any suitable order. In still other embodiments, one or more of the procedures, the processes, and/or the activities of method 1500 can be combined or skipped. In several embodiments, system 300 (FIG. 3) can be suitable to perform method 1500 and/or one or more of the activities of method 1500. In these or other embodiments, one or more of the activities of method 1500 can be implemented as one or more computing instructions configured to run at one or more processors and configured to be stored at one or more non-transitory computer-readable media. Such non-transitory computer-readable media can be part of a computer system such as management platform server 310 and/or web server 320. The processor(s) can be similar or identical to the processor(s) described above with respect to computer system 100 (FIG. 1).

In some embodiments, method 1500 further can include a block 1510 of, among other things shown in FIG. 15, adding an event to an incident report by the associate. In several embodiments adding an event to an incident report can include returning an item of an order. In several embodiments adding an event to an incident report can include cancelling an item of an order.

In many embodiments, method 1500 additionally can include a block 1520 of, among other things shown in FIG. 15, recording the event details of the incident report to the DAO. In some embodiments, recording the event details of the incident report to the DAO can include saving the updated incident report to the DAO.

Figure 16:
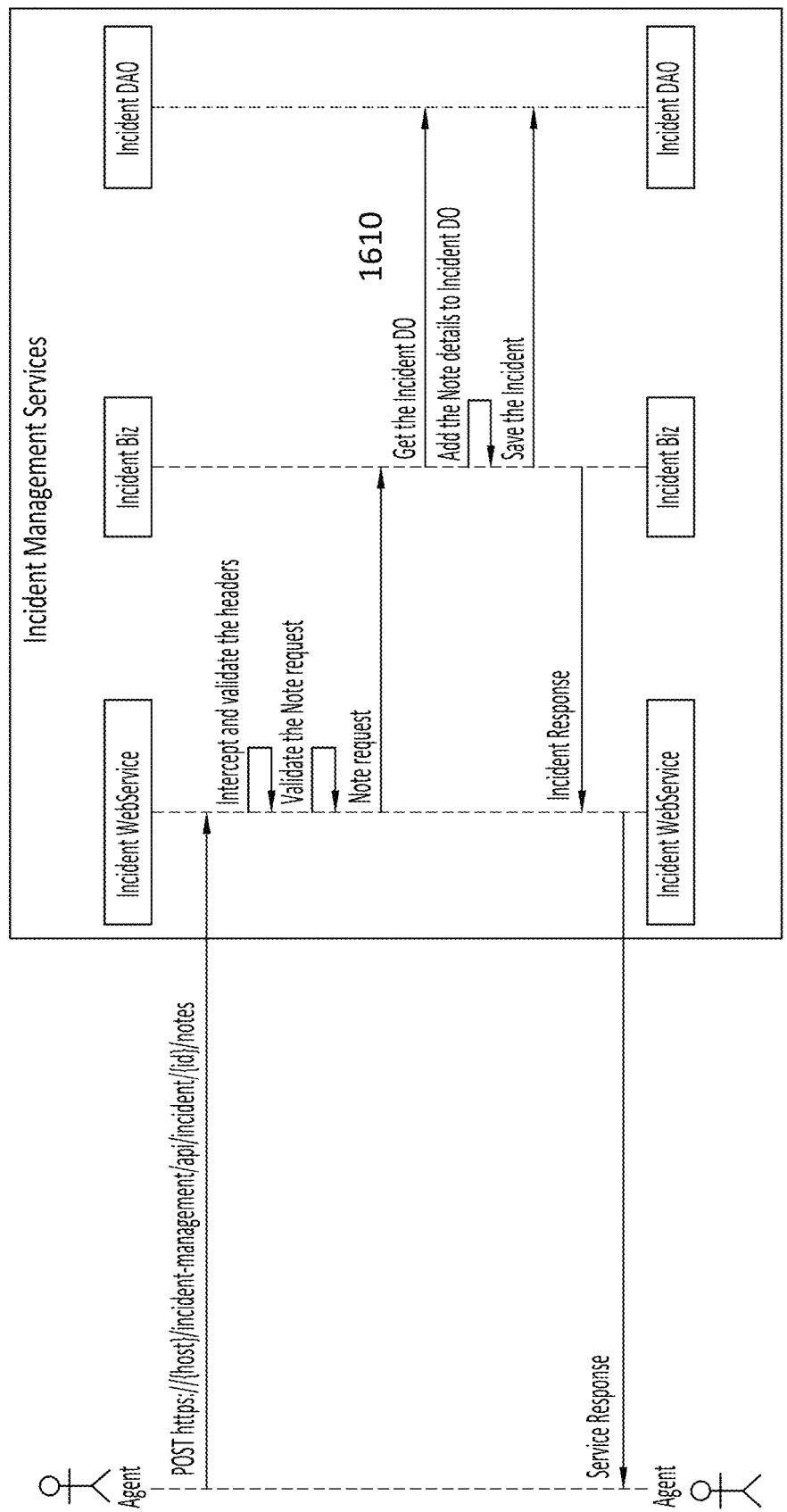
FIG. 16. illustrates a flow chart for a method, according to another embodiment.

Turning ahead to the drawings, FIG. 16 illustrates a flow chart for a method, according to another embodiment of method 400 (FIG. 4). Method 1600 can be similar to method 400 (FIG. 4), and various procedures, processes, and/or activities of method 1600 can be similar or identical to various procedures, processes, and/or activities of method 400 (FIG. 4). Method 1600 can be employed in many different embodiments and/or examples not specifically depicted or described herein. In some embodiments, the procedures, the processes, and/or the activities of method 1600 can be performed in the order presented. In other embodiments, the procedures, the processes, and/or the activities of method 1600 can be performed in any suitable order. In still other embodiments, one or more of the procedures, the processes, and/or the activities of method 1600 can be combined or skipped. In several embodiments, system 300 (FIG. 3) can be suitable to perform method 1600 and/or one or more of the activities of method 1600. In these or other embodiments, one or more of the activities of method 1600 can be implemented as one or more computing instructions configured to run at one or more processors and configured to be stored at one or more non-transitory computer-readable media. Such non-transitory computer-readable media can be part of a computer system such as management platform server 310 and/or web server 320. The processor(s) can be similar or identical to the processor(s) described above with respect to computer system 100 (FIG. 1).

In some embodiments, method 1600 further can include a block 1610 of, among other things shown in FIG. 16, adding a note to the incident report entered by the associate. In several embodiments, adding a note to the incident report entered by the associated can include documenting the details of the interaction between the user and the associate. In many embodiments, documenting the details of the interaction between the user and the associate can include adding behind the scenes details of the interaction between an associate and another associate.

Figure 17:
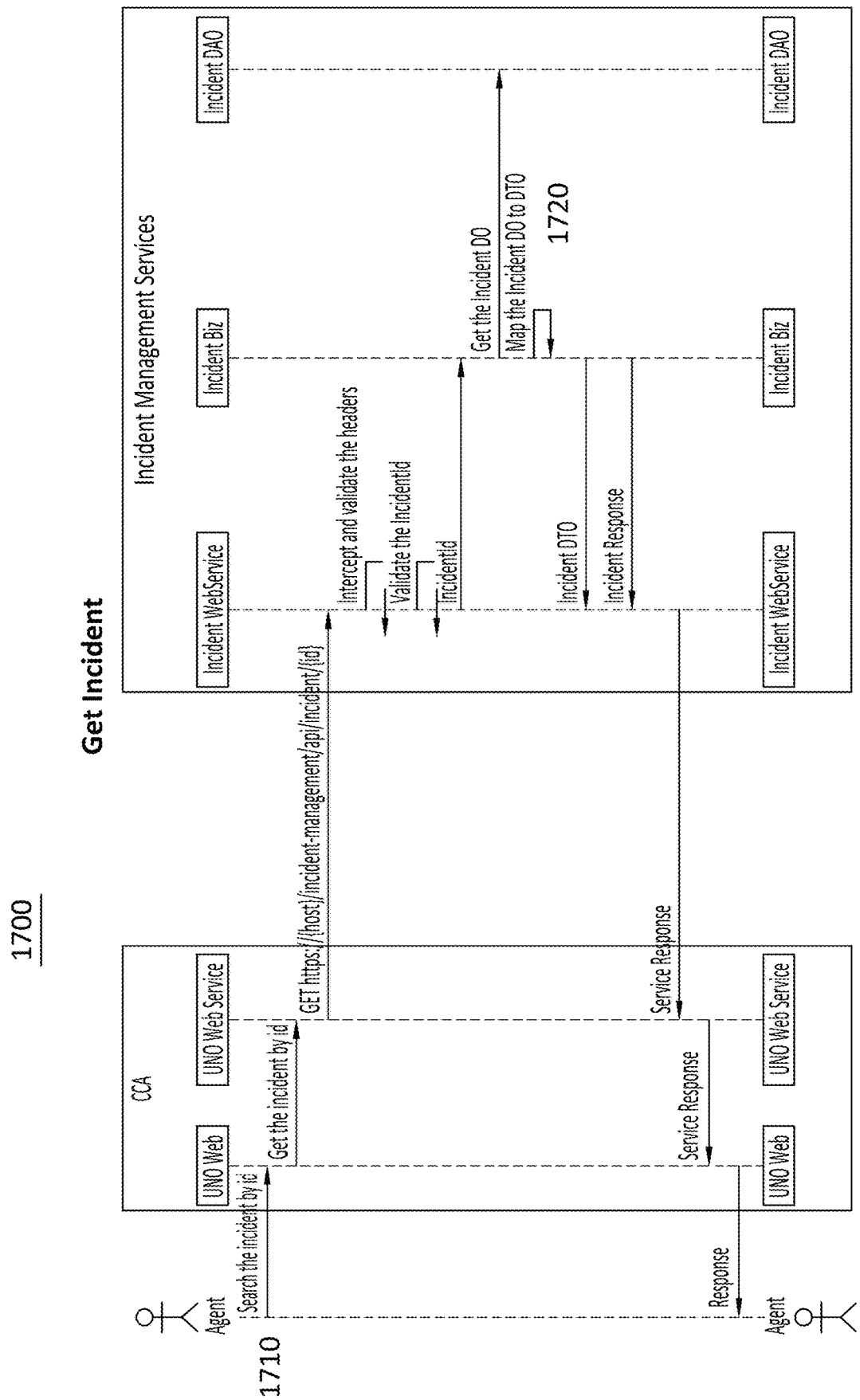
FIG. 17. illustrates a flow chart for a method, according to another embodiment.

Referring to the drawings, FIG. 17 illustrates a flow chart for a method, according to another embodiment of method 400 (FIG. 4). Method 1700 can be similar to method 400 (FIG. 4), and various procedures, processes, and/or activities of method 1700 can be similar or identical to various procedures, processes, and/or activities of method 400 (FIG. 4). Method 1700 can be employed in many different embodiments and/or examples not specifically depicted or described herein. In some embodiments, the procedures, the processes, and/or the activities of method 1700 can be performed in the order presented. In other embodiments, the procedures, the processes, and/or the activities of method 1700 can be performed in any suitable order. In still other embodiments, one or more of the procedures, the processes, and/or the activities of method 1700 can be combined or skipped. In several embodiments, system 300 (FIG. 3) can be suitable to perform method 1700 and/or one or more of the activities of method 1700. In these or other embodiments, one or more of the activities of method 1700 can be implemented as one or more computing instructions configured to run at one or more processors and configured to be stored at one or more non-transitory computer-readable media. Such non-transitory computer-readable media can be part of a computer system such as management platform server 310 and/or web server 320. The processor(s) can be similar or identical to the processor(s) described above with respect to computer system 100 (FIG. 1).

In some embodiments, method 1700 further can include a block 1710 of, among other things shown in FIG. 17, searching for the incident report by an identification number. In several embodiments, searching for the incident report by an identification number can include using the user identification retrieved from the customer care service database. In many embodiments, using the user identification retrieved from the customer care service database can include using an integrated single platform system incorporating customer information and corresponding incident reports of the user. In many embodiments, searching for the incident report by an identification number can include using an identification number assigned to the incident request. In some embodiments, searching for the incident report by an identification number can include using the identification number of an associate that previously interacted with the user addressing the incident request.

In many embodiments, method 1700 additionally can include a block 1720 of, among other things shown in FIG. 17, retrieving the incident report from a data object (DO). In several embodiments, mapping the incident report from the DO to the DTO.

One advantage of the management platform server is as a whole can process the incident requests faster due to the integration of the customer service information and the incident report system into a single independent platform. Further, in some embodiments, the computer processing time for each incident report can be performed in near real-time. These techniques described herein can provide a significant improvement over conventional approaches of using separate systems for customer care and incident reports. Moreover, these techniques are improvements over other possible approaches. In many embodiments, the techniques described herein can beneficially impact performance of a single independent platform by simultaneously receiving an incident request and assigning the user to an associate in real-time.

In many embodiments, the techniques described herein can provide several technological improvements. In various embodiments, receiving a request using an incident management system can reduce handling time between the user and an associate providing end-to-end visibility into historical interactions of the user with one or more associates for one or more incident reports. In some embodiments, the techniques provided herein can beneficially reduce computing resources and costs while continuing to offer real-time updates on pending incident reports of a user.

In a number of embodiments, the techniques described herein can advantageously provide a consistent user experience by dynamically addressing each incident request by a user by assigning the incident request to an associate that can use an integrated interface on a user device to search and/or retrieve previous incident reports and dispositions mapped the user. In several embodiments, historical interactions of the user can include intermediate recordings in various formats recording all actions taken during each interaction thus can be beneficial to prevent fraudulent activities.

In many embodiments, the techniques described herein can be used continuously at a scale that cannot be handled using manual techniques. For example, the number of daily and/or monthly visits to the customer service website can exceed approximately one million and/or other suitable numbers. The number of products and/or items sold on the website can exceed approximately ten million (10,000,000) approximately each day. And the number of associates addressing each incident request can exceed approximately six thousand (6,000) on a given day.

In a number of embodiments, the techniques described herein can solve a technical problem that arises only within the realm of computer networks, as determining whether to update a product with certain derived attributes based on rule change events does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because a content catalog, such as an online catalog, that can power and/or feed an online website that is part of the techniques described herein would not exist.

Various embodiments include a system. The system can include one or more processors and one or more non-transitory computer-readable media storing computing instructions configured to run on the one or more processors and perform certain acts. The acts can include generating an incident report for an incident request received from a user device of a user. The incident request can be received through one or more contact channels. The acts also can include sending an application program interface (API) request to a management platform for customer care to identify the user. The acts further can include assigning the incident report to an associate user interface of an associate device of an associate. The acts additionally can include retrieving a customer record associated with the user from a database of the management platform for customer care. The customer record can include historical interactions between the user and the system. The historical interactions can include systematic recordings of historical intermediate communications. The historical intermediate communications can be automatically recorded by the system while the user was interacting with one or more previous associates. The acts also can include populating the associate user interface with the customer record. The acts additionally can be automatically recording in real-time a new record of a present interaction between the associate and the user for the incident report. The new record can include intermediate communications between the user and the associate. The new record also can include one or more responses to the incident request by the associate. The acts further can include transmitting the new record for storage in the database of the management platform for customer care.

Several embodiments can include a method. The method can be implemented via execution of computing instructions configured to run at one or more processors and stored at one or more non-transitory computer-readable media. The method can include generating an incident report for an incident request received from a user device of a user. The incident request can be received through one or more contact channels. The method also can include sending an application program interface (API) request to a management platform for customer care to identify the user. The method further can include assigning the incident report to an associate user interface of an associate device of an associate. The method additionally can include retrieving a customer record associated with the user from a database of the management platform for customer care. The customer record can include historical interactions between the user and a system. The historical interactions can include systematic recordings of historical intermediate communications. The historical intermediate communications can be automatically recorded by the system while the user was interacting with one or more previous associates. The method also can include populating the associate user interface with the customer record. The method further can include automatically recording in real-time a new record of a present interaction between the associate and the user for the incident report. The new record can include intermediate communications between the user and the associate. The new record also can include one or more responses to the incident request by the associate. The method additionally can include transmitting the new record for storage in the database of the management platform for customer care.

Although automatically recording a new record that can include intermediate communications of interactions between a user and one or more associates using a management platform server has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-17 may be modified, and that the foregoing discussion of certain of these embodiments does not necessarily represent a complete description of all possible embodiments. For example, one or more of the procedures, processes, or activities of FIGS. 3-17 may include different procedures, processes, and/or activities and be performed by many different modules, in many different orders, and/or one or more of the procedures, processes, or activities of FIGS. 3-17 may include one or more of the procedures, processes, or activities of another different one of FIGS. 3-17. As another example, the systems within management platform server 310, webserver 320 and/or physical stores 325 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
generating an incident report for an incident request received from a user device of a user;
sending an application program interface (API) request to a management platform for customer care to identify the user;
assigning the incident report to an associate user interface of an associate device of an associate;
retrieving a customer record associated with the user from a database of the management platform for customer care, wherein the customer record comprises historical interactions between the user and the system, the historical interactions comprising systematic recordings of historical intermediate communications automatically recorded by the system while the user was interacting with one or more associates, and wherein retrieving the customer record further comprises retrieving one or more associate notes entered by the one or more associates, wherein the one or more associate notes comprise details of one or more historical interactions between the user and the one or more associates;
populating the associate user interface with the customer record and the one or more associate notes, as retrieved;
automatically recording in real-time a new record of a present interaction between the associate and the user for the incident report, the new record comprising (i) intermediate communications between the user and the associate, and (ii) one or more responses to the incident request entered by the associate; and transmitting the new record for storage in the database of the management platform for customer care.

2. The system of claim 1, wherein assigning the incident report to the associate user interface further comprises:
determining a nature of the incident request;
evaluating a proposed response to the incident request; and
mapping the incident request to a data access object ("DAO") for assignment to the associate device.

3. The system of claim 1, wherein assigning the incident report to the associate user interface of the associate device further comprises:
transmitting to the associate user interface of the associate device a pop-up window comprising a new incident identification number associated with the incident request of the user.

4. The system of claim 1, wherein retrieving the customer record associated with the user further comprises:
identifying the customer record by searching for an associate identification number within the databases of the management platform for customer care, wherein an associate having the associate identification number has interacted with the user in the one or more historical interactions with the user.

5. The system of claim 1, wherein
the details of the one or more historical interactions between the user and the one or more associates comprise a subject of a prior incident request, a date and time of an interaction between the user and the one or more associates regarding the prior incident request, comments by the one or more associates related to the prior incident request, and a resolution to the prior incident request.

6. The system of claim 1, wherein populating the associate user interface with the customer record further comprises:
transmitting to the associate user interface a record of one or more interactive voice response ("IVR") options previously entered by the user and automatically stored by the management platform for customer care.

7. The system of claim 1, wherein populating the associate user interface with the customer record further comprises:
receiving by the associate user interface one or more records of communications previously recorded between the user and the one or more associates and stored in the database of the management platform for customer care, the customer record comprising the one or more records of communications.

8. The system of claim 1, wherein populating the associate user interface with the customer record further comprises:
receiving by the associate user interface one or more transcriptions of previous communications between the user and the one or more associates, wherein the one or more transcriptions comprise at least one of short message server ("SMS") text communications, emails, or one or more social media messages received via one or more social media platforms, recorded by the management platform for customer care, and stored in the database of the management platform for customer care, the customer record comprising the one or more transcriptions.

9. The system of claim 1, wherein automatically recording in real-time the new record of the present interaction further comprises:

updating the incident request, tagged as pending, with supplemental information related to a final resolution of the incident request.

10. The system of claim 1, wherein automatically recording in real-time the new record of the present interaction further comprises:
adding an event to the incident report comprising a cancellation of an order;
creating a note in the new record of the present interaction; and
executing, pursuant to instructions from the associate device, the event in response to the incident request of the user.

11. A method being implemented via execution of computing instructions configured to run at one or more processors and stored at one or more non-transitory computer-readable media, the method comprising:
generating an incident report for an incident request received from a user device of a user;
sending an application program interface (API) request to a management platform for customer care to identify the user;
assigning the incident report to an associate user interface of an associate device of an associate;
retrieving a customer record associated with the user from a database of the management platform for customer care, wherein the customer record comprises historical interactions between the user and a system, the historical interactions comprising systematic recordings of historical intermediate communications automatically recorded by the system while the user was interacting with one or more associates, and wherein retrieving the customer record further comprises retrieving one or more associate notes entered by the one or more associates, wherein the one or more associate notes comprise details of one or more historical interactions between the user and the one or more associates;
populating the associate user interface with the customer record and the one or more associate notes, as retrieved;
automatically recording in real-time a new record of a present interaction between the associate and the user for the incident report, the new record comprising (i) intermediate communications between the user and the associate, and (ii) one or more responses to the incident request entered by the associate; and
transmitting the new record for storage in the database of the management platform for customer care.

12. The method of claim 11, wherein assigning the incident report to the associate user interface further comprises:
determining a nature of the incident request;
evaluating a proposed response to the incident request; and
mapping the incident request to a data access object ("DAO") for assignment to the associate device.

13. The method of claim 11, wherein assigning the incident report to the associate user interface of the associate device further comprises:
transmitting to the associate user interface of the associate device a pop-up window comprising a new incident identification number associated with the incident request of the user.

14. The method of claim 11, wherein retrieving the customer record associated with the user further comprises:
identifying the customer record by searching for an associate identification number within the databases of the management platform for customer care, wherein an associate having the associate identification number has interacted with the user in the one or more historical interactions with the user.

15. The method of claim 11, wherein
the details of the one or more historical interactions between the user and the one or more associates comprise a subject of a prior incident request, a date and time of an interaction between the user and the one or more associates regarding the prior incident request, comments by the one or more associates related to the prior incident request, and a resolution to the prior incident request.

16. The method of claim 11, wherein populating the associate user interface with the customer record further comprises:
transmitting to the associate user interface a record of one or more interactive voice response ("IVR") options previously entered by the user and automatically stored by the management platform for customer care.

17. The method of claim 11, wherein populating the associate user interface with the customer record further comprises:
receiving by the associate user interface one or more records of communications previously recorded between the user and the one or more associates and stored in the database of the management platform for customer care, the customer record comprising the one or more records of communications.

18. The method of claim 11, wherein populating the associate user interface with the customer record further comprises:
receiving by the associate user interface one or more transcriptions of previous communications between the user and the one or more associates, wherein the one or more transcriptions comprise at least one of short message server ("SMS") text communications, e-mails, or one or more social media messages received via one or more social media platforms, recorded by the management platform for customer care, and stored in the database of the management platform for customer care, the customer record comprising the one or more transcriptions.

19. The method of claim 11, wherein automatically recording in real-time the new record of the present interaction further comprises:
updating the incident request, tagged as pending, with supplemental information related to a final resolution of the incident request.

20. The method of claim 11, wherein automatically recording in real-time the new record of the present interaction further comprises:
adding an event to the incident report comprising a cancellation of an order;
creating a note in the new record of the present interaction; and executing, pursuant to instructions from the associate device, the event in response to the incident request of the user.

* * * * *